United States Patent
Adler-Nissen et al.

(10) Patent No.: US 6,331,323 B1
(45) Date of Patent: Dec. 18, 2001

(54) METHOD AND APPARATUS FOR STIR-FRYING

(75) Inventors: Jens Adler-Nissen, Sofievej 16 C, Hellerup DK-2900; Jens-Peter Jensen, Moelledalen; Einar Dyhr, Skodsborgvej, all of (DK)

(73) Assignee: Jens Adler-Nissen, Hellerup (DK)

( * ) Notice: Subject to any disclaimer, the term of this patent is extended or adjusted under 35 U.S.C. 154(b) by 0 days.

(21) Appl. No.: 09/589,009

(22) Filed: Jun. 7, 2000

Related U.S. Application Data

(63) Continuation of application No. PCT/DK98/00540, filed on Dec. 9, 1998.

(30) Foreign Application Priority Data

| Dec. 9, 1997 | (DK) | .................................................. 1430/97 |
| Mar. 30, 1998 | (DK) | ................................................ 00439/98 |
| Nov. 6, 1998 | (DK) | ................................................ 01442/98 |

(51) Int. Cl.[7] .............................. A23L 1/00; A47J 27/00
(52) U.S. Cl. ............................. 426/523; 99/348; 99/357; 426/519
(58) Field of Search ................................. 426/520, 523, 426/519, 438; 99/348, 357; 366/249, 279, 282

(56) References Cited

U.S. PATENT DOCUMENTS

| 2,011,699 | 8/1935 | Amend ................................. 259/107 |
| 3,635,147 | * 1/1972 | Lee ........................................... 99/348 |
| 3,805,687 | 4/1974 | van de Kundert ...................... 99/352 |
| 4,197,018 | 4/1980 | Green, Jr. .............................. 366/248 |
| 4,274,751 | 6/1981 | Rector et al. .......................... 366/310 |

FOREIGN PATENT DOCUMENTS

| 800470 | 11/1950 | (DE). |
| 0411178 | 2/1991 | (EP). |
| 0702922 | 3/1996 | (EP). |
| 0715826 | 6/1996 | (EP). |
| 0779052 | 6/1997 | (EP). |
| 0856261 | 8/1998 | (EP). |
| 892078 | 3/1944 | (FR). |
| 2575041 | 6/1986 | (FR). |
| 2578153 | 9/1986 | (FR). |
| 1521003 | 8/1978 | (GB). |
| 3290164 | 12/1991 | (JP). |
| 6261831 | 9/1994 | (JP). |
| 6277154 | 10/1994 | (JP). |

OTHER PUBLICATIONS

Derwent Publication No. XP002097012, Feb. 27, 1990.

* cited by examiner

*Primary Examiner*—George C. Yeung
(74) *Attorney, Agent, or Firm*—Klein & Szekeres, LLP

(57) ABSTRACT

A method and apparatus for stir-frying discrete pieces or particles of one or more foodstuffs by heating a surface (14) and bringing discrete pieces into contact with the heated surface through an inlet means (22), transporting said discrete pieces across the heated surface (14) by means of a mechanically driven stirring means and scraping means in the form of a helix (4), the discrete pieces being stirred such that the orientation of same with respect to the heated surface (14) is altered such that the various surface portions of the discrete pieces are brought into heat conducting contact with the heated surface (14), at the same time scraping the heated surface (14) by means of the rim of the helix or by means of special scraping and stirring elements (27) arranged along the rim of the helix such that the entire area of the heated surface contacted by the discrete pieces is scraped mechanically so as to remove any layer of material originating from the foodstuffs and adhering to the heated surface (14) and finally, removing the discrete pieces from contact with the heated surface through an outlet means (25, 26).

23 Claims, 13 Drawing Sheets

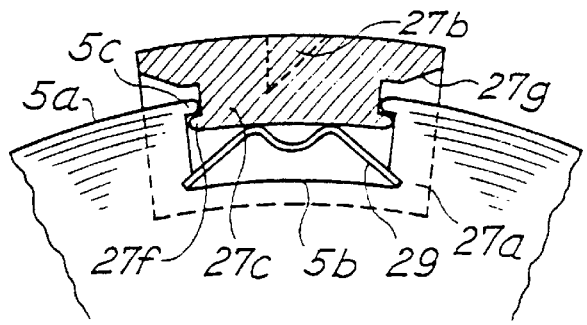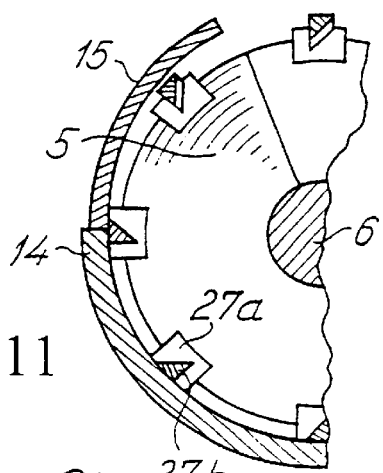
Fig. 10　　　Fig. 11
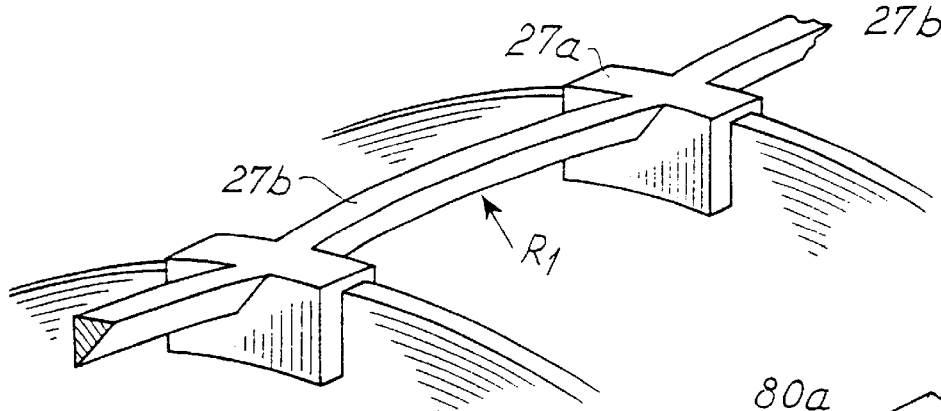
Fig. 12
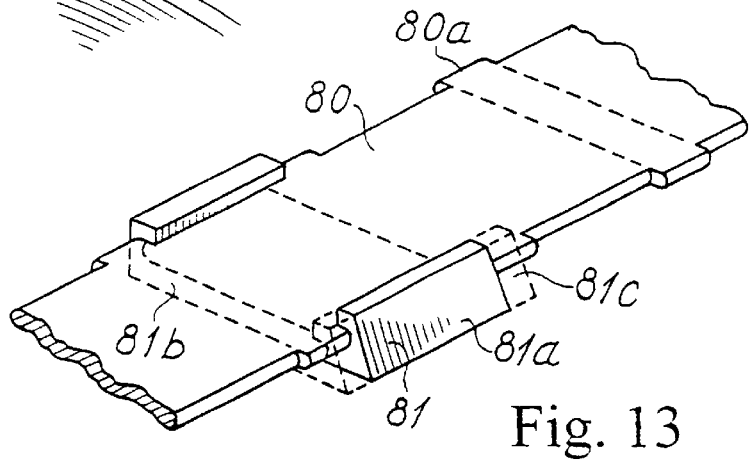
Fig. 13
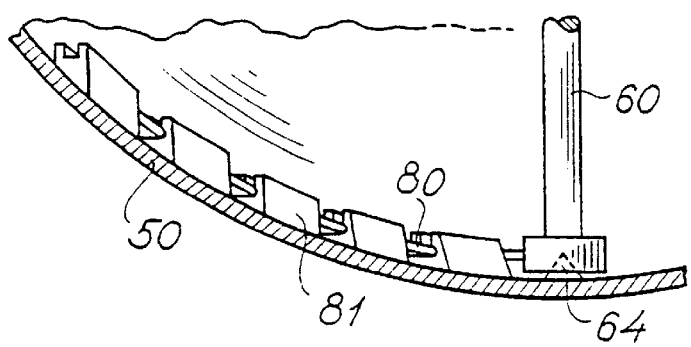
Fig. 14

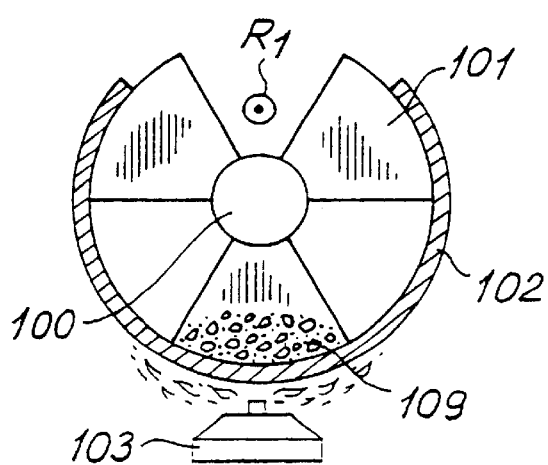
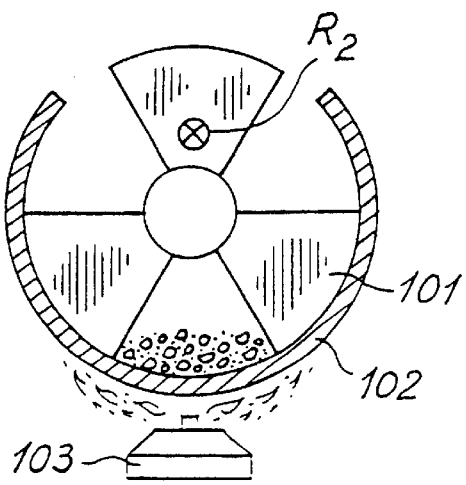
Fig. 15a            Fig. 15b
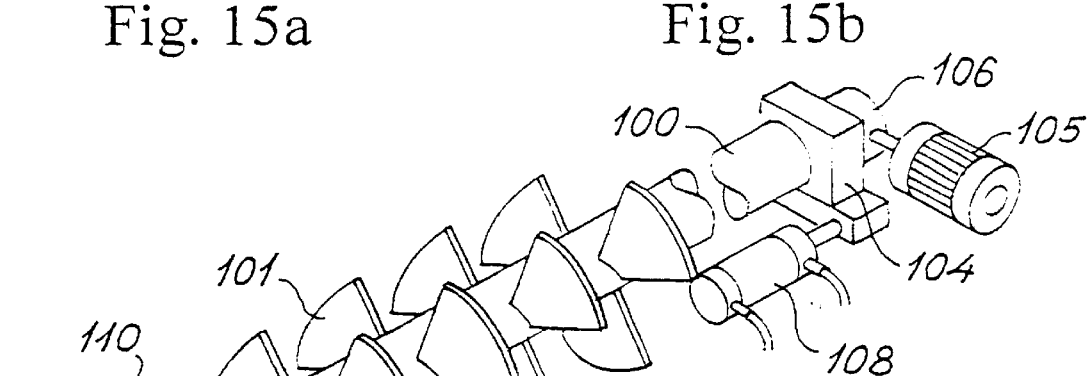
Fig. 15c
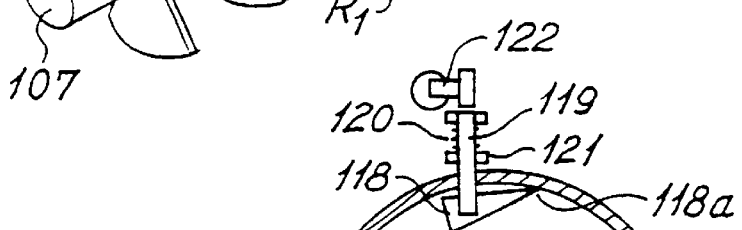
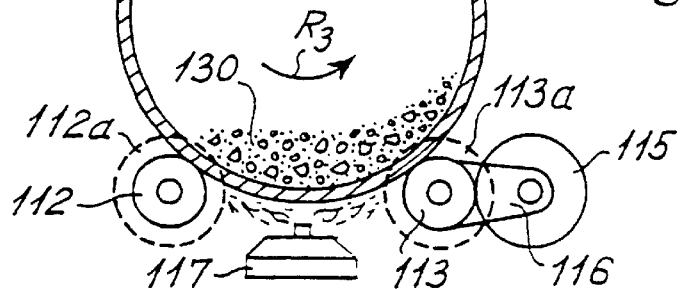
Fig. 16a

METHOD AND APPARATUS FOR STIR-FRYING

CROSS-REFERENCE TO RELATED APPLICATION

This application is a Continuation of co-pending International Application No. PCT/DK98/00540; filed Dec. 9, 1998.

BACKGROUND OF THE INVENTION

The present invention relates to a method of stir-frying discrete pieces or particles of one or more foodstuffs such as for instance finely cut or diced vegetables or meat as well as an apparatus for carrying out said method and the product produced thereby.

Stir-frying is an important cooking method in the Oriental cuisine for the cooking of finely cut or diced meat and vegetables. In domestic households, stir-frying is usually carried out in a shallow iron pot (Chinese "wok"). In this cooking vessel, the cut raw materials together with cooking oil are subjected to a brief but intense heating procedure under vigorous stirring. The stirring serves not only to mix the ingredients and present new surface portions of the ingredients for being fried by contact with the heated surface of the iron pot but also to scrape the heated surface continuously so that no burning takes place. In the case of vegetables, correct stir-frying yields a tender but firm texture and little exudated water. These two quality criteria are met because of the relatively short cooking time and the concomitant evaporation of water due to the intense heating.

Oriental stir-fried dishes have become increasingly popular in most parts of the world because of their attractive texture and the ease by which stir-fried ingredients can be used as part of ready-made dishes. Examples found in supermarkets today are frozen meat-and-vegetable mixes which can be prepared immediately by stir-frying in the kitchen. In Chinese springrolls the filling mix inside the pancake is also traditionally prepared by stir-frying. Springrolls have become immensely popular as a complete ready-made meal, and the demand has given rise to a large-scale industrial production of springrolls.

The up-scaling of springroll production from household scale to industrial scale is not a trivial problem, provided the producer wishes to match the traditional high quality of springrolls prepared in small scale. One of the problems originates from the difficulties in scaling up of the stir-frying process. Conventional batch cooking vessels cannot yield the necessary high transfer of heat due to an unfavorable low proportion between batch volume and heat transfer area. The result is that the vegetables get a different texture from the desired and rather resemble water-cooked vegetables. In addition, batch cooking is labor intensive and therefore tiring and furthermore requires skill on the part of the cook to achieve consistently high quality end products. There is therefore a need for, on one hand, an industrial-scale continuous stir-frying process and apparatus which can provide the same intense heat transfer as in household cooking so that the desired quality of the stir-fried product can be obtained and, on the other hand, a mechanical batch stir-frying process and apparatus whereby a consistently high quality product may be obtained without substantial manual effort and requiring no special skills while allowing production of relatively large batches of stir-fried product with consistent results.

Most types of continuous cooking equipment are not meant for stir-frying of cuttings but for the heating of starch pastes and other high-viscous foods. For example, a French patent application FR 2,578,153 (1986) describes the cooking of a soft starch paste product in a closed-chamber screw conveyor unit. This process resembles the conventional single screw extrusion cooking process.

Stir-frying is distinguished from deep-fat frying by the fact that stir-fried products are in contact with the heated walls in the equipment, and that only a thin layer of oil covers the heated walls. Furthermore, the stir-frying process is characterized by the food material being particulate, where the particles are continuously overturned so that all faces of the particles can come in brief contact with the heated wall. Without this over-turning of the food pieces they will burn and stick to the walls, and the products will not achieve the uniform, fried, crispy surface that is an essential quality characteristic of stir-fried food.

In a device disclosed in U.S. Pat. No. 3,805,687 the mixing and frying of the ingredients is carried out on an inclined, heated frying surface. A scoop transporter moves to and from along the frying surface scooping up the ingredients from the frying surface and slinging them further along the frying surface towards the discharge end thereof, thereby transporting the ingredients along the frying surface while mixing them and presenting new surface portions thereof for frying contact with the frying surface. This device is in practice only suited for treating relatively large pieces such as French fried potatoes having no tendency to agglomerate, and, moreover, no scraping of the frying surface is performed. Furthermore, the device is relatively complicated and therefore relatively expensive while being difficult to keep clean.

EP-0 779 052-A1 discloses a device having a heating surface in the form of a trough wherein the ingredients to be cooked are transported from an inlet to an outlet thereof by means of a screw conveyor rotatably arranged in the trough fitting closely around the screw conveyor. No provision is made for effectively scraping the heating surface and therefore the heated inner surface of the trough will become caked with material from the ingredients thereby leading to burning of said material and consequent low quality of the end product.

SUMMARY OF THE INVENTION

The object of the invention is to provide a method and an apparatus whereby the disadvantages of the known methods and apparatus are eliminated and whereby there is achieved the proper combination of scraping, of stirring and of the high relative heat transfer area which all three are essential for obtaining the desired quality of the stir-fried products.

According to the invention this is achieved by the method comprising the steps of:

providing a heated surface, supplying the discrete pieces to the heated surface for bringing them into direct heat conducting contact therewith, providing mechanically driven stirring means, mechanically stirring the discrete pieces so that the orientation of the discrete pieces with respect to the heated surface is altered such that various surface portions of the discrete pieces are brought into heat conducting contact with the heated surface, providing mechanically driven and/or stationary scraping means adjacent the heated surface, mechanically scraping the entire area of the heated surface contacted by the discrete pieces so as to remove any layer of material originating from the foodstuffs and adhering to the heated surface, removing the discrete pieces from contact with the heated surface for transfer to a separate storing or processing means for said discrete pieces in stir-fried condition.

Hereby, a continuous stir-frying method is obtained whereby a good quality product is obtained in a particularly consistent manner with good scraping of the heated surface.

It will be obvious to those skilled in the art that the desired scraping effect of the scraping means is obtained by movement of said scraping means relative to the heated surface and therefore such relative movement may be obtained by providing the heated surface with mechanical means to move the surface relative to the scraping means that may be stationary or also be mechanically movable.

Likewise, it will be obvious to those skilled in the art that the desired stirring effect is obtained by applying a force to the discrete pieces so as to cause them to move relative to the heated surface. Such a force may be obtained by moving the heated surface relative to the stirring means or by inclining the heated surface relative to the force of gravity such that force of gravity results in a movement of the discrete pieces relative to the heated surface.

Preferably, the stirring means and at least part of the scraping means are interconnected.

Advantageously, at least part of the scraping means may be fixedly attached to or integral with the stirring means.

In the currently preferred embodiment of the method according to the invention, the discrete pieces are supplied to the heated surface at a first portion thereof and are removed from the heated surface at a second portion thereof, the stirring means and/or the scraping means being adapted to transfer the discrete pieces from the first portion to the second portion during the stirring and/or scraping operation, and advantageously, some of the discrete pieces may be supplied to the heated surface at one or more further portions thereof located between said first portion and said second portion.

In the currently preferred embodiment of the method according to the invention, the discrete pieces are supplied continuously to the heated surface and are continuously removed from the heated surface for transfer to separate processing or storage means.

Preferably, the temperature of the heated surface varies between said first portion and said second portion, and the temperature of the heated surface is between 100° C. and 300° C. Hereby, the various foodstuff components supplied at various portions of the heated surface may subjected to different processing temperatures thereby affording a particularly flexible and high quality stir-frying treatment thereof.

In the preferred embodiment of the method according to the invention, the period of time between the discrete pieces being supplied to the heated surface and being removed from the heated surface is chosen as a function of the foodstuff involved, the size of the discrete pieces and the temperature or temperatures of the portions of the heated surface contacted by the foodstuff involved.

In a currently preferred embodiment of the method according to the invention, the heated surface comprises a substantially circular cylindrical body, and the stirring means comprise a helical body arranged for rotation at least partly within and in close proximity to said cylindrical body and extending from said first portion of the heated surface to said second portion of the heated surface such that rotation of the helical body transfers the discrete pieces along the cylindrical body substantially parallel to the axis thereof from said first portion or said further portions to said second portion, and the scraping means comprise scraping elements attached to the outer helical rim of the helical body, and/or the stirring means comprise stirring elements attached to the outer helical rim of the helical body.

The helical body may be designed as a continuous screw or as a discontinuous screw (for instance flat or curved plates mounted radially on an axle in a helical pattern). Such design alternatives are well known from the technical literature with well known advantages and disadvantages with respect to performance and cost of manufacture.

It will be obvious to those skilled in the art that the cylindrical body may be mechanically rotatable while the stirring and scraping means are stationary. In such case the stirring means may be dispensed with as the natural tumbling of the discrete pieces owing to the force of gravity will provide sufficient stirring, By tilting the axis of the rotatable cylindrical body downwards from the first, inlet, portion to the second, outlet, portion, the transport of the discrete pieces parallel with the axis of the cylindrical body will ensue as a result of the tumbling effect combined with the downwards tilt of the axis and thus the helical body may also be dispensed with. In the latter case the scraping means may be arranged on or be part of an elongated body such as a plate or rod extending parallel with the axis of the cylindrical body. The heated surface may in this case comprise substantially the entire cylindrical body.

Preferably, a common integral element constitutes a stirring element and a scraping element and advantageously, the elements are removably attached to the helical rim of the helical body.

Advantageously, the axis of the cylindrical body and the helical body may be arranged at an acute angle, preferably 0°–45° relative to the horizontal plane such that at least a substantial fraction of the weight of the helical body is supported by the cylindrical body.

Preferably, the angle of the axis relative to the horizontal plane is such that the discrete pieces move upwards when transported from the said first or the said further portions of the heated surface towards the said second portion of the heated surface.

In the currently preferred embodiment of the method according to the invention, the helical body is arranged for transverse movement to and from at right angles to the axis thereof, and advantageously, the helical body may be arranged for longitudinal movement parallel with the axis thereof.

Longitudinal movement of the helical body parallel to the axis thereof is particularly advantageous when the helical body forms a discontinuous screw with blades or arms mounted radially as the steps of a spiral staircase as a synchronization of the longitudinal movement with the rotation of the helical body will allow transport of the discrete pieces parallel to the axis with practically the same efficiency as a helical body in the form of a continuous screw as set out below in relation to the description of one of the embodiments of an apparatus according to the invention.

In an advantageous alternative embodiment of the method according to the invention the heated surface comprises a substantially circular cylindrical body arranged for rotation about the axis thereof, and the scraping means and stirring means comprise flexible means arranged for contacting the interior surface of the cylindrical body and for movement relative to said interior surface.

Preferably, the flexible means are arranged for movement relative to said interior surface such that the transport of the discrete pieces to be stir-fried from an inlet end of the cylindrical body to an outlet end thereof is at least partly caused by said relative movement of said flexible means.

So as to be able to reproduce a desired stir-frying process, the relative movement of the flexible means is advantageously controlled according to a set of pre-determined parameters corresponding to the characteristics of the discrete pieces to be stir-fried and/or the characteristics of the stir-fried end product to be obtained.

Preferably, cleaning means are arranged within the cylindrical body for cleaning the flexible means so as to avoid adherence thereto of any material from the discrete pieces or any frying substance introduced into the cylindrical body.

In many applications it is desirable to avoid processing hot material after stir-frying and therefore, preferably the method comprises the step of cooling the stir-fried discrete pieces.

When stir-frying certain products, liquid is released, said liquid together with any frying oil or grease causing a boiling effect that is detrimental to the quality of the end product and therefore advantageously the method may comprise the step of separating any liquid formed as well as any flowable frying substance such as oil or grease from the discrete pieces continuously during the stir-frying process and/or at the end thereof.

As minced or chopped meat is a difficult material to process because of its tendency form a sticky mass, the method according to the invention may advantageously, when the discrete pieces comprise minced meat, comprise the additional steps of:

forming agglomerations such as balls, sausages or the like from the minced meat, supplying the agglomerations to the heated surface for at least partly coagulating the minced meat in the agglomerations, subjecting the agglomerations to a disintegration process so as to disintegrate the agglomerations at least partly into the constituent discrete pieces and supplying the disintegrated agglomerations to the same or another heated surface for continued stir-frying thereof.

In an advantageous alternative embodiment of the method according to the invention, the heated surface comprises a generally circular cylindrical bowl-shaped portion with a substantially vertical axis of symmetry, the discrete pieces being introduced into contact with the heated surface batch-wise and removed therefrom batch-wise after being stir-fried, and preferably, the stirring means comprise a propeller-like element having one or more propeller wings shaped in conformity with the bottom portion of the bowl-shaped portion arranged for rotation around said axis of symmetry such that the wings sweep the entire area of the bottom of the bowl-shaped portion and the adjacent region of the side surface of the bowl-shaped portion, the discrete pieces being introduced batch-wise into contact with said swept area and removed batch-wise therefrom after being stir-fried.

It will be obvious to those skilled in the art that batch-wise stir-frying may be performed in a circular cylindrical body with a substantially horizontal axis and having a heated surface cooperating with stirring and scraping means rotating around said axis. Alternatively, the cylindrical body may rotate while the stirring means and scraping means are stationary. In the latter case the heated surface may comprise substantially the entire cylindrical body.

Advantageously, the one or more propeller wings may comprise a strip of resilient material such as steel or heat resistant plastic material, the strip preferably being provided with scraping and stirring elements disposed thereon or formed therein along the length of thereof such that the elements are in scraping contact with the heated surface, and preferably, the propeller-like element is resiliently biased towards said bottom portion.

In a further advantageous embodiment of the method according to the invention, various portions of the discrete pieces of foodstuffs are subjected to stir-frying in two or more discrete and separate steps in series and/or in parallel, each step by means of a continuous stir-frying method according to the invention as described above.

The invention further relates to an apparatus for stir-frying discrete pieces or particles of one or more foodstuffs such as for instance finely cut or diced vegetables or meat, the apparatus comprising a frame supporting a surface to be heated, stirring means for stirring said discrete pieces so that the orientation of the discrete pieces with respect to the surface is altered such that various surface portions of the discrete pieces are brought into heat conducting contact with the surface, scraping means arranged adjacent said surface for scraping substantially the entire area of the surface contacted by the discrete pieces so as to remove any layer of material originating from the foodstuffs and adhering to the surface, inlet means for supplying the discrete pieces to the surface for bringing them into direct heat conducting contact therewith, and outlet means for removing the discrete pieces from contact with the surface for transfer to a separate storing or processing means for said discrete pieces in fried condition.

Preferably, the stirring means and at least part of the scraping means are interconnected.

Advantageously, at least part of the scraping means are fixedly attached to or integral with the stirring means.

In the currently preferred embodiment of the apparatus according to the invention, the apparatus further comprises inlet means adjacent a first portion of the heated surface for supplying the discrete pieces to the heated surface at said first portion thereof and outlet means adjacent a second portion of the heated surface for removing the stir-fried discrete pieces from said second portion of the heated surface, the stirring means and/or the scraping means being adapted to transfer the discrete pieces from the first portion to the second portion during the stirring and/or scraping operation, and advantageously, the apparatus further comprises one or more further inlet means adjacent one or more further portions of the heated surface for supplying some of the discrete pieces to the heated surface at one or more further portions thereof located between said first portion and said second portion.

Preferably, the apparatus further comprises temperature control means for varying the temperature of the heated surface between said first portion and said second portion.

In a preferred embodiment of the apparatus according to the invention, the heated surface comprises a substantially circular cylindrical body, and the stirring means comprise a helical body arranged for rotation at least partly within and in close proximity to said cylindrical body and extending from said first portion of the heated surface to said second portion of the heated surface such that rotation of the helical body transfers the discrete pieces along the cylindrical body substantially parallel to the axis thereof from said first portion or said further portions to said second portion.

Preferably, the scraping means comprise scraping elements attached to the outer helical rim of the helical body.

Advantageously, the stirring means comprise stirring elements attached to the outer helical rim of the helical body.

In the preferred embodiment, a common integral element constitutes a stirring element and a scraping element, and the elements are removably attached to the helical rim of the helical body.

Advantageously, the axis of the cylindrical body and the helical body is arranged at an acute angle, preferably 0°–45° relative to the horizontal plane such that at least a substantial fraction of the weight of the helical body is supported by the cylindrical body.

Preferably, the angle of the axis relative to the horizontal plane is such that the discrete pieces move upwards when transported from the said first or the said further portions of the heated surface towards the said second portion of the heated surface.

So as to obtain a particularly effective scraping of the heated surface, the helical body is arranged for transverse movement to and from at right angles to the axis thereof.

Advantageously, the helical body is arranged for longitudinal movement parallel with the axis thereof.

In an alternative embodiment, the heated surface comprises a substantially circular cylindrical body arranged for rotation about the axis thereof, and the scraping means and stirring means comprise flexible means arranged for contacting the interior surface of the cylindrical body and for movement relative to said interior surface.

Preferably the flexible means are arranged for movement relative to said interior surface such that the transport of the discrete pieces to be stir-fried from an inlet end of the cylindrical body to an outlet end thereof is at least partly caused by said relative movement of said flexible means.

Advantageously, the apparatus further comprises driving means for driving the flexible means for said relative movement and controlling means for controlling said driving means according to a set of pre-determined parameters corresponding to the characteristics of the discrete pieces to be stir-fried and/or the characteristics of the stir-fried end product to be obtained.

Preferably, cleaning means are arranged within the cylindrical body for cleaning the flexible means so as to avoid adherence thereto of any material from the discrete pieces or any frying substance such as oil or grease introduced into the cylindrical body, and advantageously, the apparatus may further comprise cooling means arranged downstream of the heated surface such that the stir-fried discrete pieces are cooled after being stir-fried.

Advantageously, the apparatus further comprises liquid separating means for separating any liquid formed as well as any flowable frying substance such as oil or grease from the discrete pieces continuously during the stir-frying process and/or at the end thereof.

In another aspect of the invention the apparatus may be designed specifically for stir-frying discrete pieces comprising minced meat and further comprises disintegration means for disintegrating agglomerations such as balls, sausages or the like of the minced meat.

Advantageously, the disintegration means may comprise a substantially smooth circular cylindrical roller and/or a conical roller preferably provided with cutting or mincing projections on the surface thereof and arranged for rotation adjacent the heated surface.

In an alternative embodiment of the apparatus according to the invention for batch-type stir-frying, the heated surface comprises a generally circular cylindrical bowl-shaped portion with a substantially vertical axis of symmetry.

In the currently preferred embodiment of the batch-type apparatus according to the invention, the stirring means comprise a propeller-like element having one or more propeller wings shaped in conformity with the bottom portion of the bowl-shaped portion and arranged for rotation around said axis of symmetry such that the wings sweep the entire area of the bottom of the bowl-shaped portion and the adjacent region of the side surface of the bowl-shaped portion.

Preferably, the one or more propeller wings comprise a strip of resilient material such as steel or heat resistant plastic material, the strip preferably being provided with scraping and stirring elements disposed thereon or formed therein along the length of thereof such that the elements are in scraping contact with the heated surface.

So as to obtain a particularly effective scraping of the heated surface and compensate for any wear of the scraping and stirring elements, the propeller-like element is resiliently biased towards said bottom portion.

The invention further relates to a stir-fried product produced by means of a method according to the invention and/or by means of an apparatus according to the invention.

In the present invention, an embodiment of the frying vessel according to the invention invention is a horizontal or slightly inclined, thick-walled iron tube heated from the outside. Inside the heating tube, the food material is fried while it is moving continuously along the tube in contact therewith and parallel with axis by the action of an internal rotating helix with a diameter only slightly smaller than the inner diameter of the tube. The helix pushes the food material forward, and stirring and scraping means mounted on the periphery of the helix turn the ingredients over so that efficient mixing is obtained. The tube has openings on the top where measured portions of food ingredients can be added, and the open construction means that the stir-frying process takes place at atmospheric pressure and that evaporation is possible. A low degree of filling ensures that the heating surface relative to the volume is high. The frying vessel is thus based on quite different principles than the conventional extrusion cooker which also applies a helix for the transport of the food material, the two major differences being that the extrusion cooker is compeletly filled with product and that it generally works at over-pressure.

Under normal operation each portion of the food material is mixed and pushed forward at the same speed. Only little of it moves relatively slower because it sticks temporarily to the helix and is transported across the central axis of the helix to the chamber behind. This means that plug-flow conditions are achieved. The processed material leaves the machine by falling through an opening in the bottom of the tube at the far end.

The scraping is obtained by stirring and scraping means mounted on the periphery of the helix. To ensure a uniform scraping of the entire heating surface, the invention also concerns the fixing and movement of the helix. The helix is turned by an axis connected to a motor through a double cardan joint so that the helix can move freely in all directions transversely to the axis. The helix therefore rests with its full weight on the bottom of the tube whereby efficient scraping is obtained during rotation. To ensure scraping of the entire surface and not only the very lowest part of the tube, the helix is pushed from side to side in a regular movement, whereby the line of contact (substantially parallel to the axis) between the helix periphery and the tube is moving up and down on the inside surface of the lower half of the tube. By proper adjustment of rotational speed of the helix and the frequency of the pushing movement, efficient scraping of the entire heating surface is obtained.

Alternative movements of the helix, such as a longitudinal movement or a combination of transverse and longitudinal movements are part of the invention.

The high relative heat transfer area is a consequence of the geometry. If the thickness of the layer of food inside the tube is kept constant, the area to volume ratio is kept constant during scaling up. The heating surface and thereby the capacity of the machine is proportional to the square of the diameter multiplied by the length of the tube.

Total cooking time is adjusted by adjusting the rotational speed of the helix. Relative cooking times are adjusted by positioning of the individual inlets of the various ingredients.

BRIEF DESCRIPTION OF THE DRAWINGS

In the following the invention will be described and explained further with reference to currently preferred embodiments of an apparatus according to the invention shown, solely by way of example, in the attached drawings where:

FIG. 10 shows an enlarged partially sectional view of a portion of the helix rim of the apparatus in FIGS. 1–3 with an alternative embodiment of the stirring and scraping elements according to the invention, FIG. 11 shows a sectional view of a cut out portion of the view shown in FIG. 2 illustrating an alternative embodiment of the tubular heated body of the first embodiment of the apparatus according to the invention, FIG. 12 shows an enlarged view of an alternative embodiment of the stirring and scraping means according to the invention, FIG. 13 shows in larger scale a partly sectional view of an alternative embodiment of a propeller for use with the embodiment of the stir-frying apparatus of FIG. 7, FIG. 14 shows a partly sectional view through part of the bottom of the embodiment of FIG. 7 with the propeller according to FIG. 13.

FIGS. 15a–15b show a cross section through an alternative embodiment of an apparatus according to the invention, FIG. 15c shows a perspective broken away view of the helical body of the apparatus in FIGS. 15a–15b, FIGS. 16a–16b show an end elevation view and a partly sectional elevational side view, respectively, of yet another embodiment of an apparatus according to the invention, FIGS. 16a–b, FIGS. 20c–d show views of the embodiment in FIGS. 20a–b with the scraper blade in a conveying position.

DETAILED DESCRIPTION OF THE INVENTION

Figure 1:
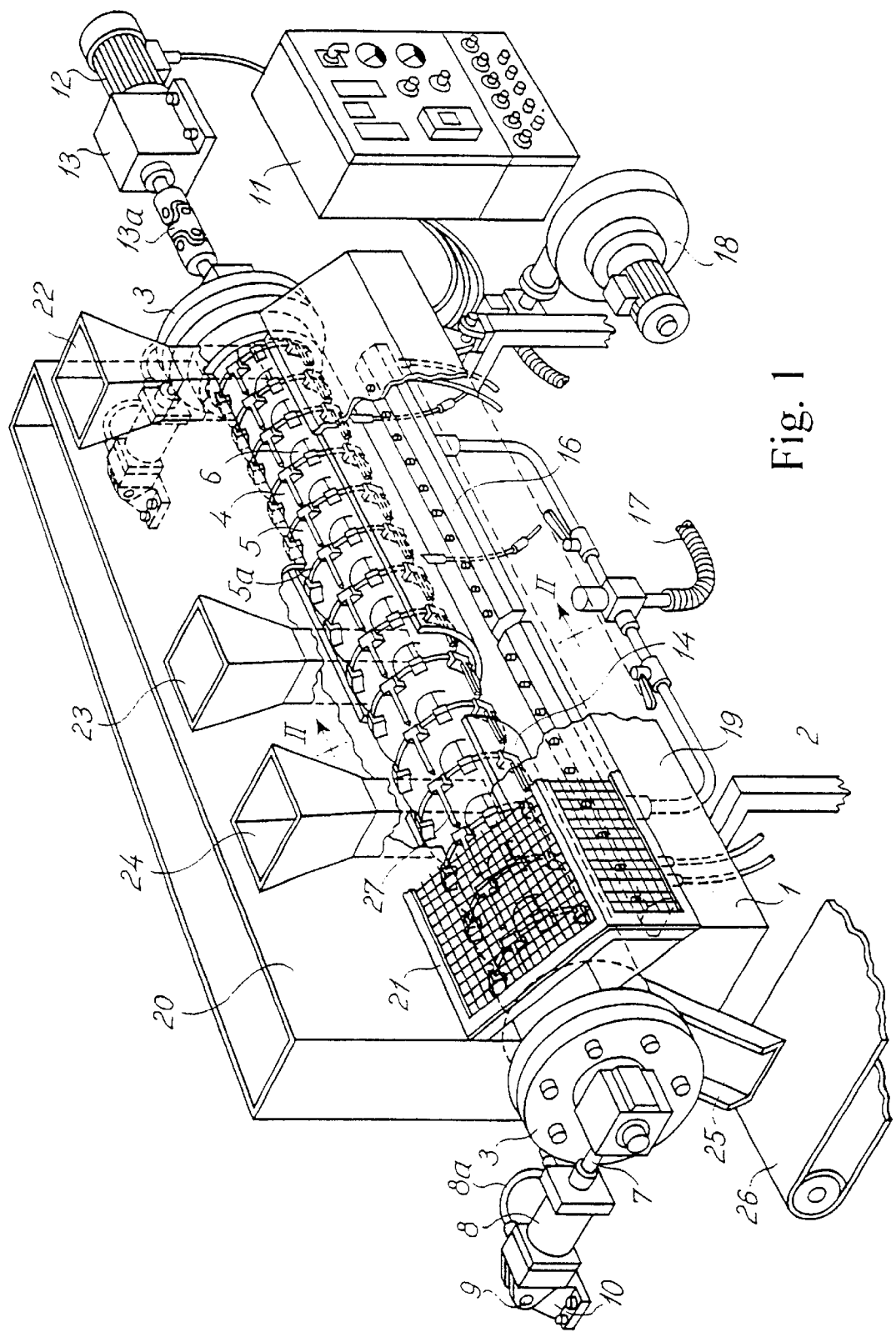
FIG. 1 shows a perspective view, partly in section, of an embodiment of an apparatus for continuously stir-frying foodstuffs according to the invention.
Figure 2:
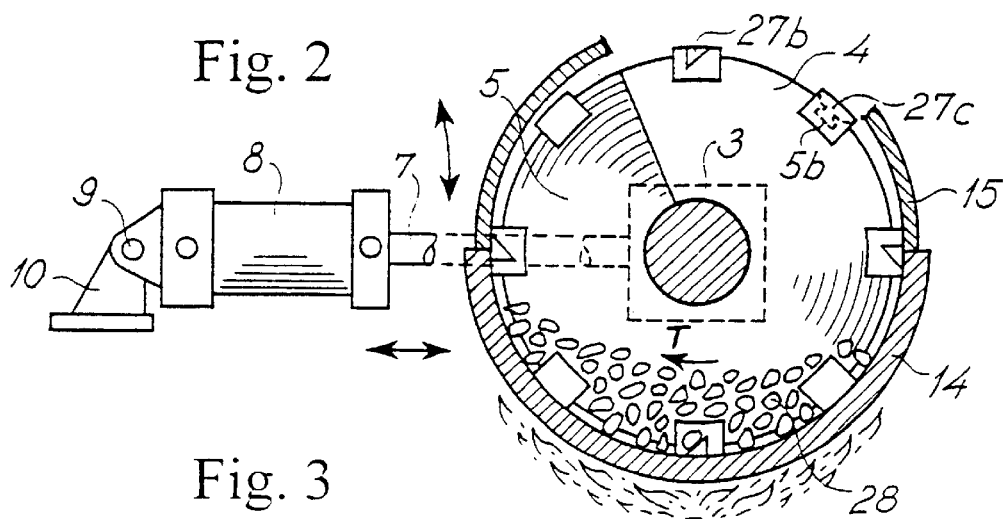
FIG. 2 shows an enlarged view of a partial cross section taken along line II—II in FIG. 1 with some parts deleted for clarity.
Figure 3:
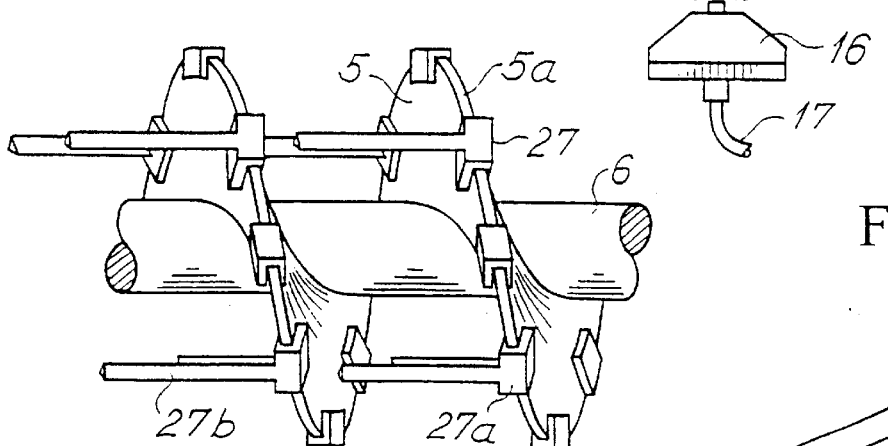
FIG. 3 shows an enlarged elevational view of a portion of the helical body of the apparatus of FIG. 1, FIGS. 4a–4e show enlarged perspective views of various embodiments of the combined stirring and scraping elements according to the invention.

Referring now to FIGS. 1–3, a housing 1 carried by support legs 2 is associated with two bearing assemblies 3 in which a helical body or screw conveyor 4 is rotatably journalled, the body 4 comprising a helical plate 5 attached to a shaft 6. The bearing assemblies 3 at either end of the shaft 6 are each supported by a respective piston rod 7 of a hydraulic cylinder and piston assembly 8 pivotally attached by means of pivot 9 to a bracket 10 bolted to a not shown fixed element alongside the housing 1 or a not shown element fixedly attached to the housing 1. The helical body 4 is thus suspended movable in a generally vertical direction because of the possibility of pivoting around the pivots 9. The helical body 4 may also be moved substantially horizontally to and from in a direction transverse to the axis of the shaft 6 by means of the reciprocating action of the piston rods 7 of the cylinder and piston assemblies 8. The assemblies 8 are activated by means of hydraulic fluid supplied through conduits 8a communicating with a hydraulic fluid pump (not shown) controlled by a conventional controlling means (not shown) arranged in a control cabinet 11.

The shaft 6 is at one end connected to a an electrical drive unit comprising an electrical motor 12 and a gear box 13 by means of a double universal joint 13a allowing movement of the shaft 6 in all directions transverse to the axis of the shaft relative to the drive unit 12, 13. The drive unit 12, 13 is fixedly arranged relative to the housing 1, and the speed of rotation of the electrical motor 12 is controlled by a conventional controlling means (not shown) in the control cabinet 11.

A cylindrical body having a thick-walled portion 14 and a thin-walled portion 15 is arranged in the housing 1 substantially coaxially with the helical body 4. The thin-walled portion is peripherically somewhat longer at one side than the other so that discrete pieces of foodstuff transported by the helical body 4 as indicated by the arrow T in FIG. 2 will not be pushed out of the cylindrical body. The portion 14 is heated by means of an elongate gas burner assembly 16 arranged in the housing 1 below the cylindrical body 14, 15. Gas for the gas burner assembly 16 is supplied through a gas conduit 17, and air for combustion as well as odour removing ventilation is supplied by a fan 18 communicating with a combustion chamber 19 arranged in the lower part of the housing 1 and accommodating the gas burner assembly 16. Exhaust gases from the combustion and ventilating air are removed from the housing through a venting portion 20 of the housing 1. The portion 15 may also have the same thickness as the portion 14.

A protecting wire mesh 21 is arranged over the helical body 4, 5 and the cylindrical body 14, 15 to avoid accidents caused by introduction of any object or a hand into the elongate aperture 21 at the top of the cylindrical body 14, 15. Foodstuff introduction funnels 22–24 are arranged on the housing 1 for introducing finely cut or diced foodstuffs through the aperture 21 into the cylindrical body 14, 15 at different points along the length thereof. The funnels 22–24 penetrate apertures therefor in the wire mesh 21.

At the outlet end of the cylindrical body 14, 15 opposite the inlet end thereof adjacent the drive unit 13, 14 an outlet aperture (not shown) in the bottom of the portion 14 communicates with a ramp member 25 for transferring stir-fried foodstuffs from the cylindrical body to a conveyor 26 for transferring the foodstuffs to further processing apparatus or storage means (not shown).

The axis of the helical body 4, 5 and the cylindrical body 14, 15 is inclined slightly upwards from the inlet end to the outlet end. The inclination is adjustable by means of adjustment elements (not shown) that allow tilting the apparatus or part of same to adjust the inclination of said axis so that the axis also may be horizontal or inclined downwards from the inlet end towards then outlet end.

The helical rim 5a of the helical plate 5 is along the entire length thereof provided with a series of equally spaced scraping and stirring elements 27, some solely comprising a scraping portion 27a and the rest additionally a stirring/scraping portion 27b, the elements 27 being firmly and removably attached to the helical rim by locking engagement of a locking projection 27c of the element 27 in a corresponding locking recess 5b in the rim 5a of the plate (shown with broken lines in FIG. 2) or alternatively or additionally, for instance, by frictional clamping engagement between the element 27 and the rim 5a. The elements 27 are made of a suitable material having good wear properties such as a suitable plastic material such as teflon or of stainless steel. Various embodiments of the elements 27 are shown in FIGS. 4a–4e and 11 and will be discussed more in detail below.

In use, discrete pieces 28 (FIG. 2) of finely cut or diced foodstuffs such as vegetables or meat are introduced through the funnel 22 together with a n optional frying substance such as oil or fat, and further discrete pieces and optionally further frying substance may be introduce d through funnels 23 and 24.

The cylindrical portion 14 is heated to a predetermined temperature controlled by conventional controlling means (not shown) controlling the gas burner gas consumption in dependency of temperature measurements via not shown conventional thermometer means arranged for measuring the temperature of the portion 14.

The helical body 4, 5 is rotated at a predetermined and variable speed of rotation depending on the foodstuffs to be fried and the temperature of the cylindrical portion 14. The cooperation between the helical body 4, 5, the scraping/stirring elements 27 and the interior surface of the cylindrical portion 14 serves to move the discrete pieces 28 forward along the inner surface of the cylindrical portion 14 substantially parallel to the axis thereof while at the same time stirring them so as to continuously bring new surface portions of the discrete pieces 28 into heat conducting contact with the heated inner surface of the cylindrical portion 14. Any excess fluid frying substance will tend to remain near the inlet end below the funnel 22 because of the slight inclination upwards from inlet end to outlet end of the body 14, 15.

The scraping/stirring elements 27 are pressed against the interior surface of the cylindrical portion 14 by the effect of the weight of the helical body 4, 5 as the entire weight of same is supported by the cylindrical portion 14 because of the pivotable suspension of the assemblies 8. Thereby, a very efficient and thorough removal by scraping of any layer of foodstuff adhering to the interior surface of the cylindrical portion 14 will be assured so that any such layer will not carbonize and degrade the taste and odour of the stir-fried product.

So as to ensure that the entire area of the interior surface of the cylindrical portion 14 contacted by the discrete pieces 28 during the stir-frying is scraped clean by the scraping elements 27, the helical body 4, 5 is moved in a direction transverse to the axis thereof by means of the cylinder piston assembly 8, the piston rod 7 being reciprocated so that the helical body 4, 5 is forced to move transversely such that region of maximum pressure between the elements 27 and the interior surface of the cylindrical portion 14 moves to and from along the circumference thereof such that maximum scraping pressure is intermittently applied to substantially the entire inner surface of the heated cylindrical portion 14.

This transverse movement of the helical body is allowed relative to the drive unit 12, 13 by the double universal joint 13a. This effect may also be obtained by mounting the drive unit for transverse movement together with the helical body or by arranging the motor 12 laterally relative to the helical body and replacing the gear box 13 by a chain and sprocket wheel interconnection to the shaft 6.

Referring now to FIGS. 4a–4e, various embodiments of the stirring/scraping elements 27 are shown. Experiments have been carried out with the different elements and a number of others not shown in connection with different foodstuffs as described in the following:

The objective of the experiments was, in view of the importance of correct scraping and stirring, to determine the best shape and relative dimensions so as to guarantee good scraping effect, good mixing or stirring and smooth transport of the material in the apparatus of FIGS. 1–3.

The raw material stir-fried during the experiments was blanched carrot and potato cubes (10×10×10 mm), chopped white and red cabbage of irregular shaped and dimensions and green peas with a diameter of 5–6 mm.

The quality of the stirring and mixing of the material, the particle distribution at the outlet, whether overflow from one "chamber" of the helical body 4/casing 14 to the preceding chamber in the flow direction took place (i.e. smooth and even transport capability), and the quality of the scraping of the inner surface of the body 14 were determined as parameters for evaluating the various stirring and scraping elements.

Figure 4A:
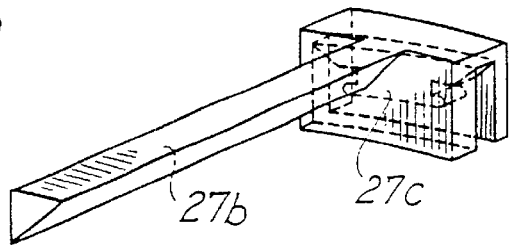

The best overall results were obtained with the scraper shown in FIG. 4a, i.e. good mixing, no overflow, randomly distributed particles at the outlet and good scraping of the frying surface was obtained for all the materials even though some tendency to sticking on the scrapers was observed for the cabbage.

Figure 4B:
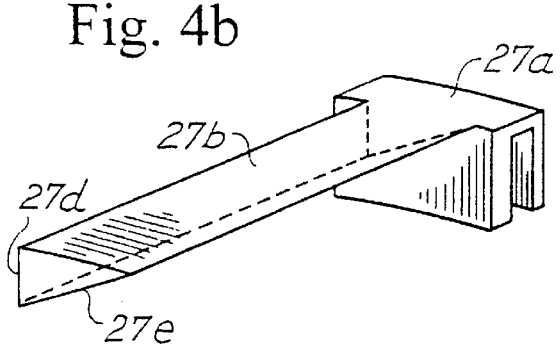
Figure 4D:
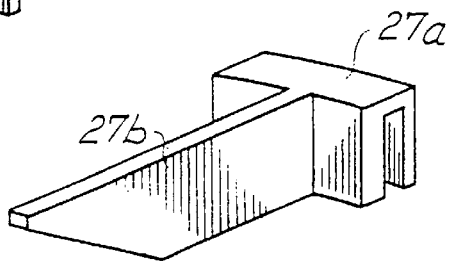
Figure 4C:
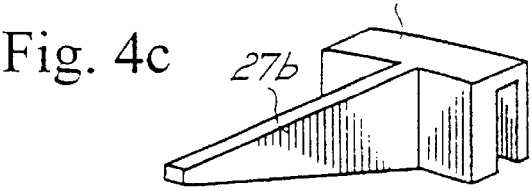

Good but relatively inferior results were obtained with the elements shown in FIGS. 4a and 4d while poor results were obtained with the element in FIG. 4b as poor mixing w as observed and the surface in contact with the material is too wide. For elements similar to FIG. 4b but having a larger inclination of the surface 27e and a wider surface 27d even poorer results were observed with no effective mixing and the material being lifted up causing overflow with consequent overcooking of the particles subjected to such overflow.

Figure 4E:
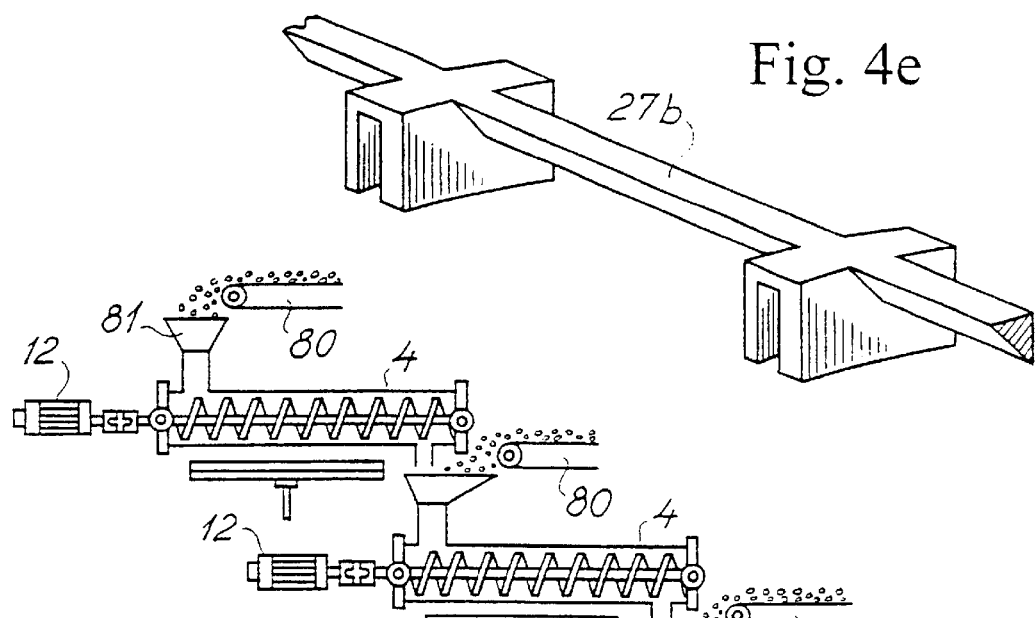

The scraping and stirring element in FIG. 4e has a cross-sectional profile as in FIG. 4a but is a through-going element spanning a number or all the windings of the helix rim 5a thereby affording greater structural strength because of the continuity of the "beam" 27b.

Experience has shown that the thickness of the elements should not be much larger than the characteristic dimension of the discrete pieces to be stir-fried, but the thickness may be smaller with due regard to the mechanical strength and rigidity of the elements. Generally speaking, the front surface 27e should be at a relatively acute angle to the axis of the helix so that the elements lift the discrete pieces away from the inner surface of the casing 14 to a distance comparable to the characteristic length of said pieces. Hereby a suitably gentle admixture is obtained.

Referring now to FIGS. 10 and 11, an alternative embodiment of the cylindrical body 14 and the stirring and scraping elements 27 is illustrated. A stirring and scraping element 27 having a projection 27c slidingly engaging a recess 5b in the rim 5a of the plate 5 of the helix 4 is biased outwards towards the inner surface of the casing 14 by means of a spring means such as a plate spring 29 arranged in the recess 5b. The recess 5b is provided with projections 5c at opposite edges for retaining the projection 27c in the recess 5b against the biasing force exerted by the spring means 29. So as to avoid clogging of the space between the edges of the scraping element 27a and the rim 5a with small particles of foodstuff thereby hindering the radial resiliency travel of the element 27a the edges thereof are provided with oblique beveled surfaces 27g allowing dislodgement of any such particle of foodstuff.

Hereby, any wear of the scraping surface of the element 27a may be compensated for such that effective scraping contact between the elements and the inner surface of the casing 14 may be maintained at all times. This feature of resilient arrangement of the scraping elements 27a may either replace the transverse movement of the helical body 4 in the casing 14 or it may complement such transverse movement.

To compensate for the resilient arrangement of the elements 27a and still allow a tight fit of the helical body 4 in the casing 14, the thin-walled portion 15 of the casing may flare slightly radially outwards as shown in FIG. 11 where the elements 27a outside the casing 14, 15 at the top are completely biased outwards and are guided into resilient contact with the casing portion 14 by the "funneling" effect of the flared portion of the casing portion 15.

The resiliency of the scraping and stirring elements may also be obtained by means of the embodiment thereof illustrated in FIG. 12. In this embodiment the stirring/scraping scraping elements are integrated with each other to form through going "beams" 27b spanning at least two of the windings and having a curvature with a suitable radius of curvature R1 such that the central area of the portion 27b will be resiliently pressed outwards against the inner surface of the casing portions 14 and 15 thus achieving the same effect as in FIG. 10, the scraping effect in this case, however, being more concentrated on the portions 27b than in the embodiment of FIG. 10.

Figure 5:
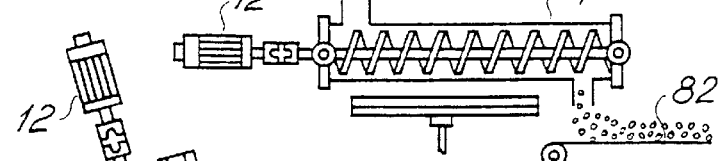
FIG. 5 shows schematically and in smaller scale an elevational, partly sectional view of a second embodiment of a continuous stir-frying apparatus according to the invention.

Referring now to FIG. 5, three stir-frying apparatus very similar to the embodiment thereof shown in FIGS. 1–3 are arranged in series with the foodstuffs to be stir-fried therein being supplied continuously by means of conveyors 80 through funnels 81 and being discharged to a conveyor 82 from the last apparatus in the series. This embodiment affords a more flexible and accurate control of the frying temperature and frying time for different ingredients and increased flexibility as regards amount of different foodstuffs. Naturally, the length and diameter of the individual apparatus in the series may be different.

Figure 6:
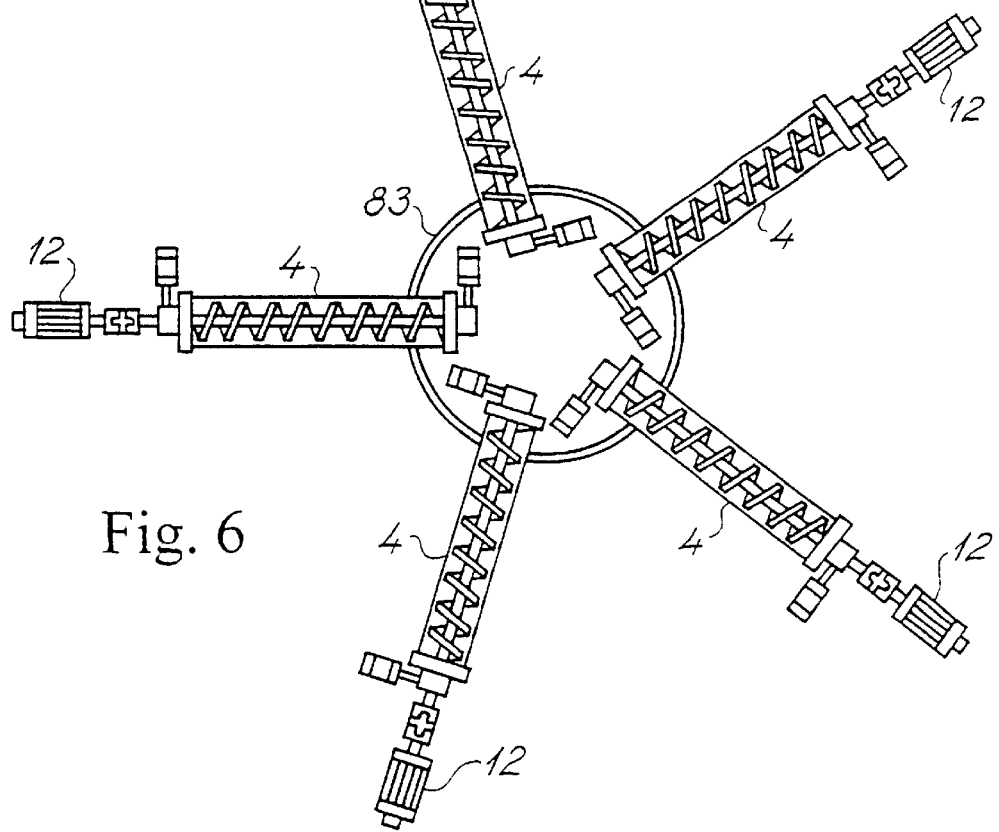
FIG. 6 shows schematically and in smaller scale a partly sectional top view of a third embodiment of a continuous stir-frying apparatus according to the invention.

Referring now to FIG. 6, five stir-frying apparatus very similar to the embodiment thereof shown in FIGS. 1–3 are arranged radially around a common discharge opening or bin 83 into which various fried foodstuffs stir-fried in each of the five apparatus 83 are discharged. This embodiment affords even more flexibility than the embodiment of FIG. 5 in that one or more of the apparatus may remain unutilized and the range of variation of frying temperature and frying time is much larger because of no need for stir-frying the various foodstuffs together as is the case in the second and third apparatus of the series thereof in FIG. 5.

A further advantage of the embodiment of FIG. 6 is that the individual apparatus may be substantially smaller for a given rate of production of stir-fried foodstuffs than in the case of the embodiments of FIGS. 1–3 and FIG. 5.

Many different combinations of two or more same or different size apparatus of FIGS. 1–3 suited for different applications will be obvious to those skilled in the art, eg. two series of two or more apparatus with a common discharge bin and so on.

Figure 7:
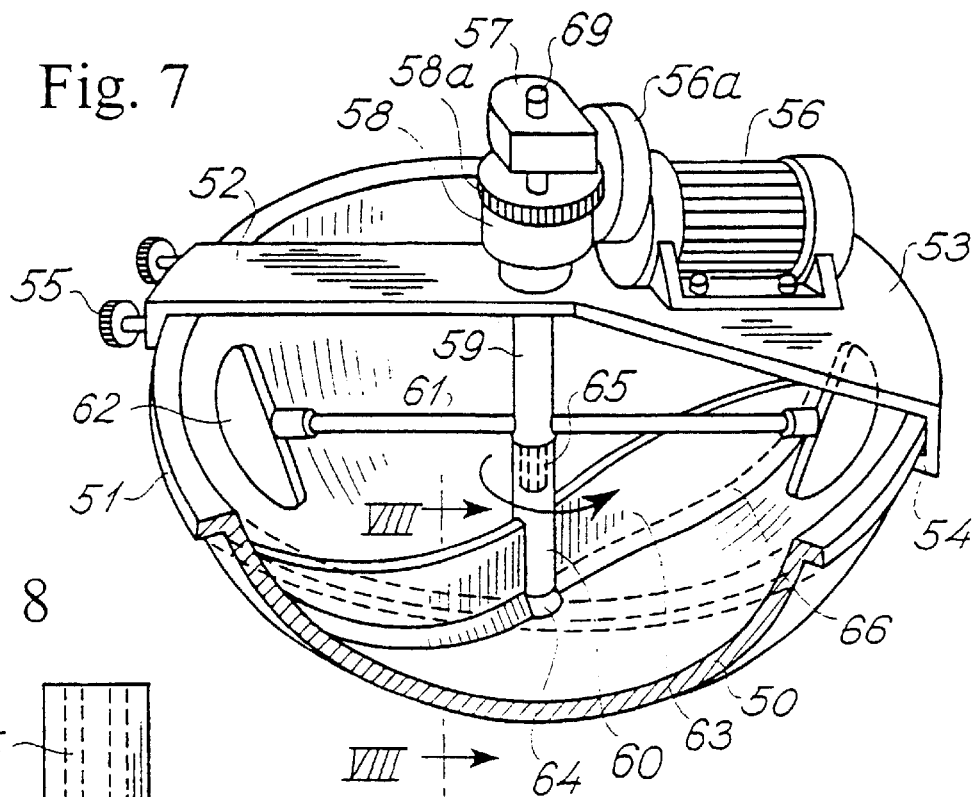
FIG. 7 shows schematically and partly in section a perspective view of an embodiment of an apparatus for batch-wise stir-frying of foodstuffs according to the invention.
Figure 8:
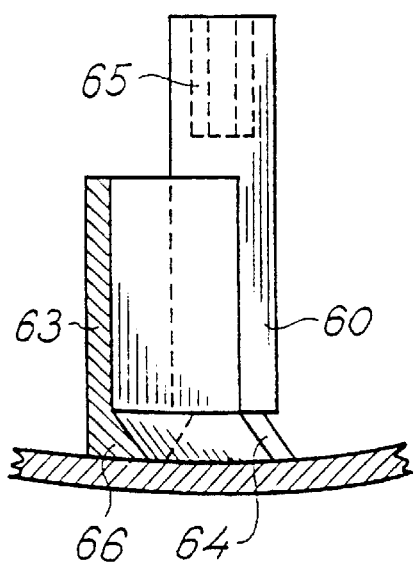
FIG. 8 shows in smaller scale a partly sectional view along line VIII—VIII of the propeller and shaft assembly of the embodiment of FIG. 7.
Figure 9:
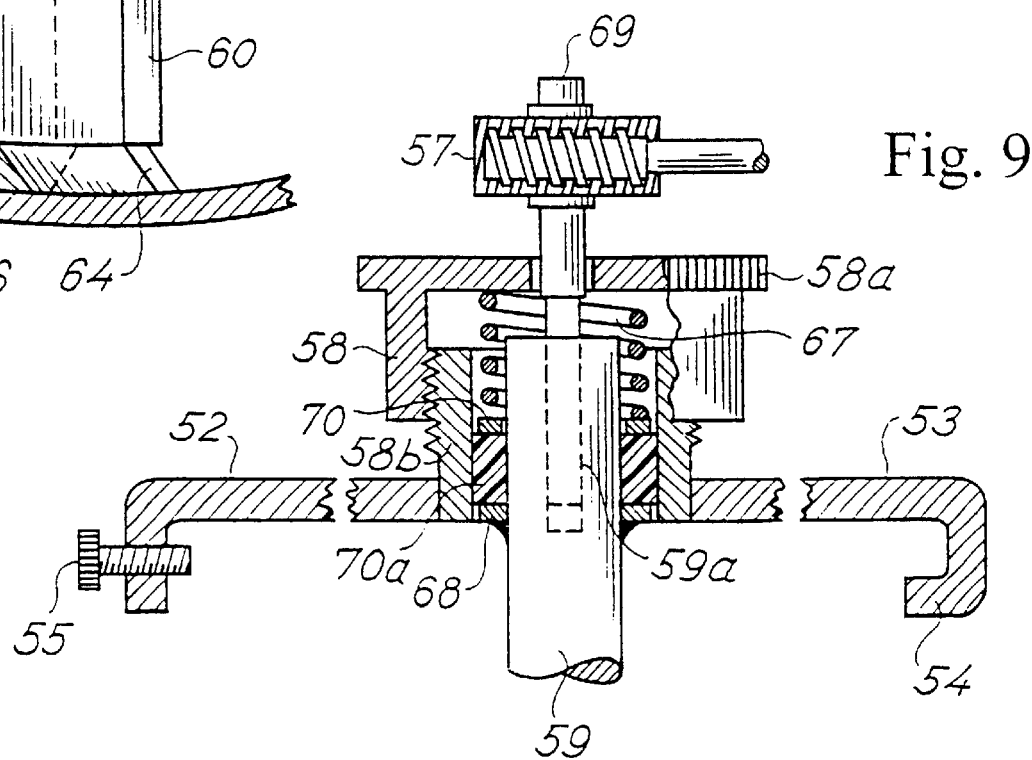
FIG. 9 shows an enlarged, partly sectional elevational view of a portion of the yoke assembly of the apparatus in FIG. 7.

Referring now to FIGS. 7–9, a batch type stir-frying apparatus is illustrated comprising a bowl shaped container 50 provided with a fully detachable stirring and scraping mechanism for automatically stirring discrete pieces of foodstuffs introduced in the container 50 and for automatically scraping the inner surface of the container 50 during the stir-frying operation.

The container 50 is generally shaped like a traditional Chinese wok but may have any suitable bowl-like shape and is of cast iron but may be made of any suitable heat conductive material such as cast aluminum or stainless steel. The container 50 may be heated by any suitable means such as gas flames, heating oil in an outer casing enveloping the outer surface of the container or inductive heating of the container. The container may be suspended so as to be tiltable for emptying or it may be supported on supporting means above a heating means or on a basis. The apparatus may be installed in a household, in a larger industrial kitchen for a restaurant or in an automated system for automatic dispensing of the relevant foodstuff components, condiments and frying fluid according to a pre-determined, variable recipe for preparing different stir-fried meals.

An annular rim 51 is provided at the edge of the container, and a yoke comprising a narrow portion 52 and a wider tapered portion 53 is arranged on the container 50 by means of a U-profile flange 54 at the rim of the portion 53 engaging the rim 51 and finger screws 55 arranged in an angled flange portion at the rim of the portion 52 engaging the rim 51 such that the yoke 52, 53 is mountable on and removable from the container 50 manually without tools. The yoke 52, 53 is sufficiently rigid to support the stirring and scraping mechanism and the drive means therefor without any substantial deformation. At the centre of the yoke 52, 53 a drive shaft 59 is arranged for being driven by an electric motor 56 fixedly attached to the yoke 52, 53 and via a manually disengagable coupling 56*a* coupled to a worm gear 57 enclosed in a housing and coupled to a vertical drive shaft 69. The drive shaft 69 is arranged to move freely in a vertical direction and is square in cross section corresponding to a square engagement aperture (not shown) in the worm gear 57 and a square elongate aperture 59*a* in upper end of the shaft 59 for receiving the lower end of the drive shaft 69. The drive shaft is thus free to be removed manually without tools from engagement with both the shaft 59 and the worm gear 57. The entire apparatus is constructed in such a manner that all parts may be disassembled and assembled manually without tools for cleaning purposes.

The main shaft 59 is coupled to a propeller shaft 60 provided with two propeller-like scraping and stirring arms 63 by means of a hexagonal end portion 65 of the shaft 59 being received in a corresponding hexagonal elongate aperture in the upper end of the propeller shaft 60. Scraping and stirring elements 62 are fixedly attached to the shaft 59 by means of arms 61. The relative angular position of the arms 63 relative to the elements 62 may be varied by turning the shaft 59 relative to the shaft 60. If more variation possibilities than six for said relative angular position is required, the end portion 65 and the corresponding aperture in the shaft 60 may be octagonal or have even more facets, for instance twelve.

The relative axial positions of the elements 62 and the outer ends of the arms 63 are such that the areas of the container inner surface swept be the elements 62 and the arms 63 when the shaft 59 rotates overlap such that foodstuff particles clinging to the inner surface of the container above the area swept by the arms 63 are dislodged by the elements 62. Said relative axial distance may be varied by replacing the shaft 59 with attached elements 62 with another shaft with the elements 62 attached at a different height.

The shafts 69 and 60 are biased downwards towards the bottom of the container by means of the biasing mechanism shown in FIG. 9. A cap 58 is threaded onto an annular insert 58*b* fixedly attached to the yoke 52, 53. A spring 67 is fixedly attached to the top inside surface of the cap 58 and abuts a ring 70 arranged loosely on top of a resilient bushing 70*a* of for instance nylon again arranged loosely on top of a ring 68 fixedly attached to the shaft 59. The spring force of the spring 67 biases the shaft 59 downwards via the ring 70, the bushing 70*a* and the ring 68, said spring force being transmitted to the elements 62 via the arms 61 whereby the elements are pressed against the inner surface of the container 50. The spring force is also transmitted to the shaft 60 and the wings 63 via the hexagonal end portion 65 abutting the bottom of the corresponding elongate aperture at the top of the shaft 60, axial movement of the shaft 59 and 60 being allowed by an upwardly tapering or pointed retaining and guiding projection 64 engaging a corresponding aperture with suitable clearance relative to the projection provided in the bottom end of the shaft 60 (FIGS. 8 and 14). The spring force of the spring 67 may be adjusted by rotating the cap 58 manually relative to the insert 58*b* by means of a gripping area 58*a* on the cap 58.

The arms 63 are arcuate in the longitudinal direction thereof so as to push the particles upwards along the inner surface of the container 50 during rotation and the bottom edges of the arms 63 are provided with a scraping and stirring edge 64 having a self-sharpening capability when being worn by friction against the inner surface of the container 50.

In use, the container 50 is heated and discrete pieces of foodstuffs, condiments and frying fluid are introduced in the container while the elements 62 and the arms 63 are rotated by the motor 56 so that the foodstuff particle are stirred well and the surface of the container in contact with the foodstuff particles is scraped effectively. The shape of the arms 63 will cause the particles to be turned over while being transported along a generally spiral path upwards where they either fall down to renew the spiral path when reaching the outer ends of the arms or will cling to the surface of the container until scraped off by the elements 62.

The entire apparatus may be disassembled manually without tools for cleaning purposes and replacement of arms 63 or elements 62. First, the drive shaft 69 is pulled upwards and removed where after the cap 58 is loosened until the spring 67 is substantially uncompressed. The yoke 52, 53 may then be removed and the rest of the components may be disassembled for cleaning. This procedure may also be used for emptying the container after terminating the stir-frying process, and the yoke may alternatively be fastened to the container by means of hinge means instead of the U-profile flange 54.

As indicated in the foregoing, the apparatus of FIGS. 7–9 may be integrated in a system for automatically introducing the various components of the finished products at various times according to a pre-determined, variable recipe, the temperature may be varied during the stir-frying process, and the container may be emptied automatically, all theses steps being controlled by computer software analogous to the system and software disclosed in U.S. Pat. Nos. 4,919,950 and 4,503,502, the contents of which are incorporated in the present description by reference.

The design of the elements 62 and the arms 63 may be varied and modified within the scope of the invention.

An alternative embodiment of the scraping and stirring arms is shown in FIGS. 13 and 14 where the arms 80 are constituted by strips of flexible material such as stainless steel or a suitable plastic material provided with stirring and scraping elements 81 clipped onto the arm 80 between ribs 80*a*. The elements 81 have inclined front edge surfaces 81*a* and may be arranged obliquely on the arm 80 with an inclined lateral edge surface 81*b* such that the entire area swept by the arm 80 during rotation thereof will also be swept by a sharpened edge of either the front edge surface 81*a* or the lateral edge surface. Alternatively or additionally, the front edge surface 81 may be prolonged by means of extensions 81*c* shown with broken lines such that the front surfaces 81*a* of adjacent elements 80 nearly abut each other with a slight distance therebetween to allow flexing of the arm 80 to conform to the shape of the container 50 and take up the spring force from the spring 67 such that substantially all the elements 81 are constantly pressed into scraping contact with the surface of the container 50.

Referring now to FIGS. 15*a*–15*c*, there is schematically shown an alternative embodiment of the helical body that is utilized for scraping, stirring and transporting the discrete pieces along the heated surface.

A shaft 100 having substantially radially extending plates 101 arranged mutually staggered and offset as the stairs in a spiral staircase is arranged in a circular cylindrical body 102 of cast iron or any suitable material having good heat conduction properties and structural strength. The cylindrical body 102 may be open at the top as shown or totally closed. The cylindrical body 10 is supported in a not shown suitable frame. The bottom of the cylindrical body 102 is heated by a row of gas burners 103 arranged along substantially the entire length of the body 102.

The shaft 100 is mounted in a support bearing 104 and is driven for rotation by an electrical motor 105 by means of a suitable transmission 106. The shaft 100 may be free at its end 107 opposite the motor 105 such that most of the weight of the shaft 100 and plates 101 is supported by the cylindrical body 102. Alternatively the end 107 may be supported in a support bearing, not shown.

The entire assembly 100, 101, 104, 105 and 106 may be displaced to and from longitudinally in the cylindrical body 102 by means of a piston and cylinder mechanism 108 as indicated by the arrows R1 and R2, respectively. The support bearing, transmission and motor are supported on a sled (not shown) that can slide or roll on tracks (not shown) parallel to the axis of the cylindrical body 102, while the piston and cylinder mechanism 108 is fixedly supported relative to the cylindrical body 102.

The motor 105 and the mechanism 108 are synchronised as regards operation by means of a suitable control circuit (not shown) such that the reciprocating movement of the helical body 100, 101 is coordinated with the rotation of same. In FIG. 15a a plate 101 is in the lowermost position and the helical body 100, 101 is moving towards the outlet of the cylindrical body 102 adjacent the end 107 of the shaft 100 thus pushing the discrete pieces from the inlet to the outlet. In FIG. 15b a space between two consecutive plates 101 is in the lowermost position and the helical body 100, 101 is moving towards the inlet adjacent the support bearing 106 such that the discrete pieces 109 are not retracted towards the inlet.

By means of this synchronisation of the rotation and reciprocation of the helical body 100, 101, the discrete pieces 109 are stirred and transported from inlet to outlet while the heated surface of the cylindrical body 102 is scraped. The edge 110 itself of each plate 101 may perform the scraping function or scraping elements 27 in FIGS. 4a–4e may be attached to the edges 110.

Obviously, a coordinated set of values for the reciprocating distance, reciprocating frequency, the speed of rotation of the helical body 100, 101 as well as the axial distance between the plates 101 is chosen such that the retention time of the discrete pieces in the cylindrical body 102 is suitable for the stir-frying process and at the same time ensuring that the entire interior surface of the cylindrical body 102 in contact with the discrete pieces 109 is scraped during the stir-frying process.

The discrete pieces 109 are introduced into the inlet and removed from the outlet by means of slisks (not shown) or any other suitable conventional means.

It will be obvious to those skilled in the art that the plates 101 may have various shapes and circumferential extents and may be replaced by scraping/stirring blades arranged on arms attached to the shaft 100 and may be configured and arranged such that the size thereof in the radial direction renders the circumference of an imaginary surface defined by the scraping edges 110 of the plates or blades slightly larger than the circumference of the interior surface of the cylindrical body 102 such that the plates or arms are elastically deformed and thus elastically press the edges 110 against the interior surface of the cylindrical body 102 which in the most simple embodiment hereof is configured as a closed tube.

Figure 16B:
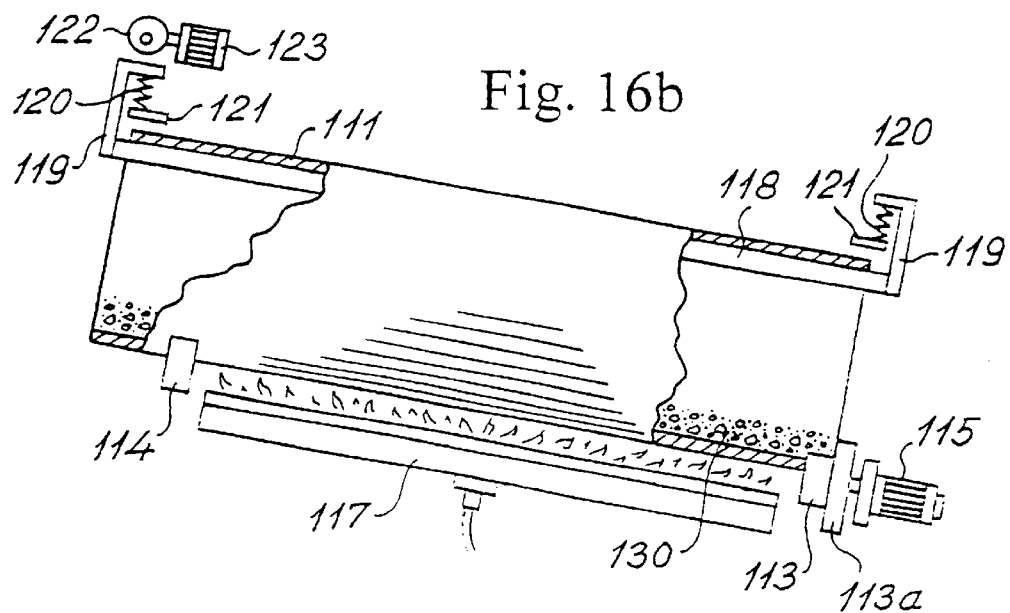

Referring now to FIGS. 16a–16b, a circular cylindrical body 111 of cast iron or a similar heat conducting material is arranged for rotation in an inclined position on rollers 112, 113 and 114. The roller 113 is driven for rotation by a suitable motor 115 and chain transmission 116 and imparts rotation to the cylindrical body 111 in the direction of the arrow R3. The rollers 112 and 113 are provided with annular flanges 112a and 113a, respectively, for avoiding axial movement of the body 111 during rotation.

An elongate scraper body 118 is suspended in arms 119 supported by compression springs 120 supported by plates 121 attached to a not shown stationary frame of the apparatus. The spring bias of the springs 121 urges an edge 118a of the scraper body 118 into abutment with the inner surface of the cylindrical body 111 such that the entire inner surface is scraped during rotation of the cylindrical body 11. The scraper body has a slight upwardly curved longitudinal shape in its free form to ensure abutment of the edge 118a against the inner surface along the entire length thereof. Scraper elements of a suitable plastic material may be attached to the edge 118a and may be elastically deformed in the operational position thereof to ensure good scraping contact.

An excentric impact hammer mechanism 122 driven by a motor 123 is provided for intermittently shaking the scraper body 118 to dislodge any material adhering to the surface thereof during operation.

The discrete pieces 130 to be stir-fried are introduced at the left hand end of the cylindrical body in FIG. 16 and are stirred by the tumbling effect of the rotation of the cylindrical body 111 while the scraping effect is achieved by means of the scraping edge 118a during said rotation.

Gas burners 117 heat the bottom of the cylindrical body 111 and the discrete pieces 130 are introduced into and removed from the inlet and outlet end, respectively, of the cylindrical body 111 by means of not shown slisks or the like.

The inclination of the cylindrical body 111 as well as the speed of rotation thereof may be varied according to the necessities of the stir-frying process.

Figure 17A:
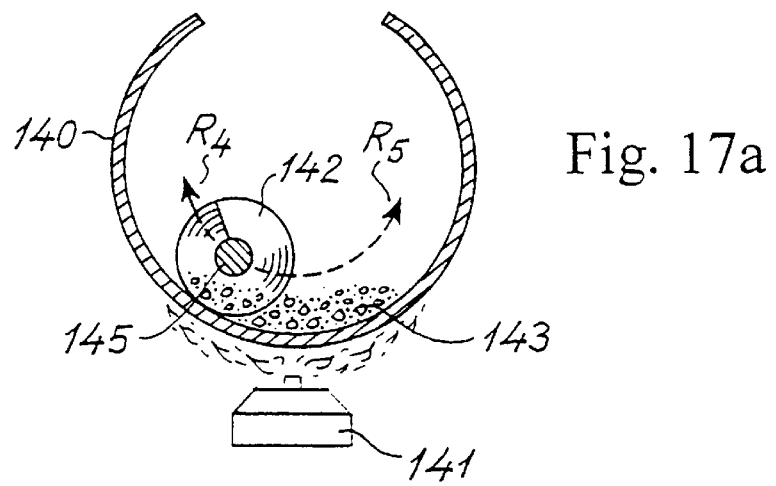
FIGS. 17a–17b show a cross sectional view and a partly sectional elevational side view, respectively, of a still further embodiment of an apparatus according to the invention.
Figure 17B:
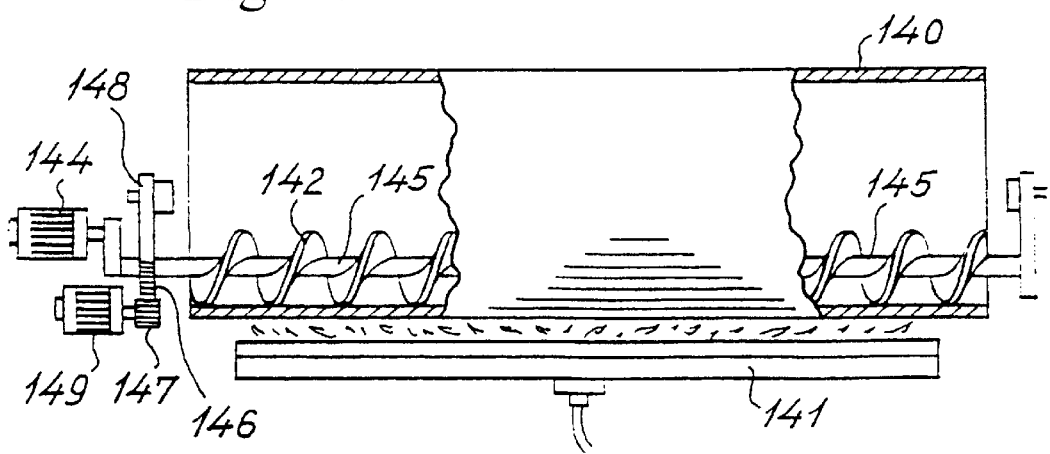

Referring now to FIGS. 17a–17b, a circular cylindrical body 140 is arranged in a not shown frame and is heated by gas burners 141. A helical body 142 is arranged partly submerged in the discrete pieces 143 to be stir-fried and in contact with the inner surface of the cylindrical body 140.

An electrical motor 144 is connected to the shaft 145 of the helical body for rotation thereof. The shaft 145 extends through a bearing arranged in a segment of a toothed plate 146 arranged for pivoting around a pivot 148, the teeth thereof meshing with the teeth of a pinion 147 driven by an electric step motor 149.

During the stir-frying process the helical body 142 rotates for stirring the discrete pieces and scraping the heated surface in a manner very similar to the manner described above in connection with the embodiment of FIG. 1. At the same time the helical body 142 is swung to and from according to the arrows R4 and R5 by means of the step motor 149, the pinion 147 and the toothed plate 147. Hereby, the helical body 142 can scrape the entire area of the heated surface of the cylindrical body 140. Scraping elements (not shown) similar to the elements 27 in FIGS. 4a–4e are arranged on the edge of the helical body 142.

Figure 18A:
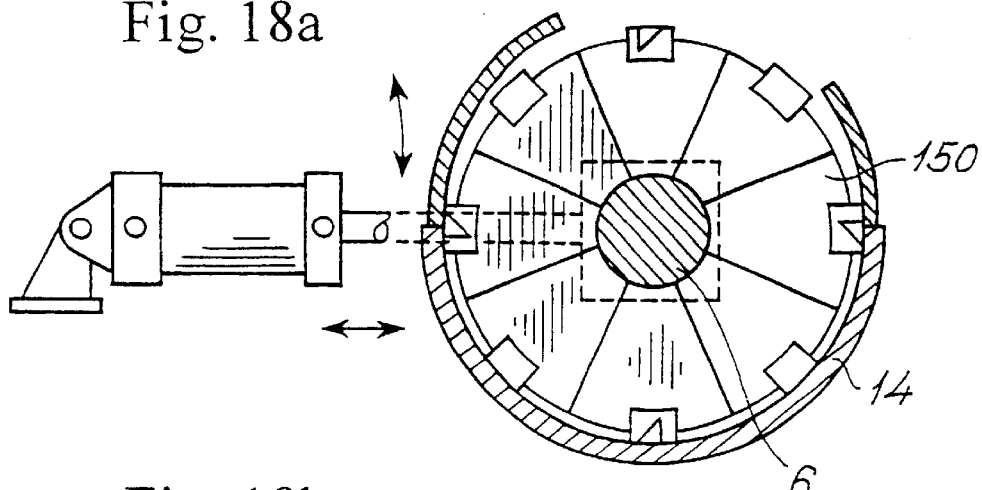
FIG. 18a shows a partially cross sectional view of yet another embodiment of the apparatus according to the invention.
Figure 18B:
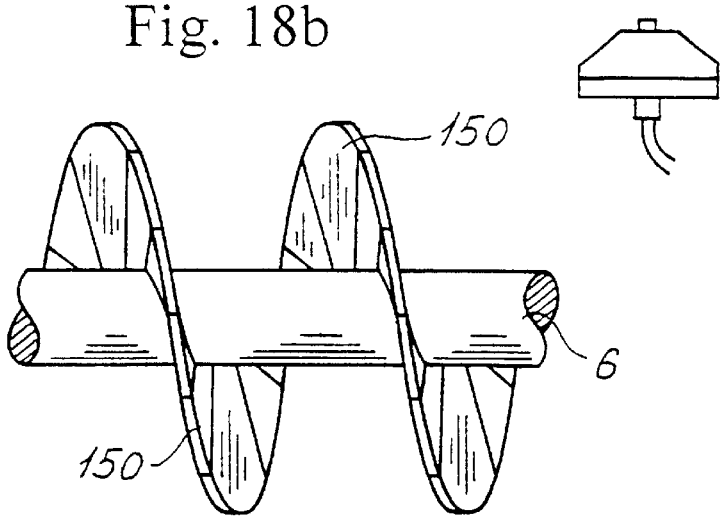
FIG. 18b shows a cut away view of the helical body of the apparatus of FIG. 18a, FIGS. 19a–19b show a cross sectional view and a partly sectional elevational side view, respectively, of a further embodiment of a batch-type apparatus according to the invention.

Referring now to FIGS. 18a–18b, this embodiment is identical to the embodiment shown in FIGS. 1–3 except that the helical plate 5 of that embodiment is replaced by a series of discrete planar plates 150 attached to the shaft 6. The plates 150 may again be replaced by blades abutting the inner surface of the cylindrical body 14 and each attached to the shaft by an arm. This embodiment illustrates that the helical plate 5 of the embodiment of FIGS. 1–3 may be replaced by many different elements as long as said elements are arranged such that when they are projected (at right angles to the projection of the axis of the shaft 6) to the line of contact there is substantially complete coverage of said line of contact such that scraping of the entire heated surface is ensured.

Figure 19A:
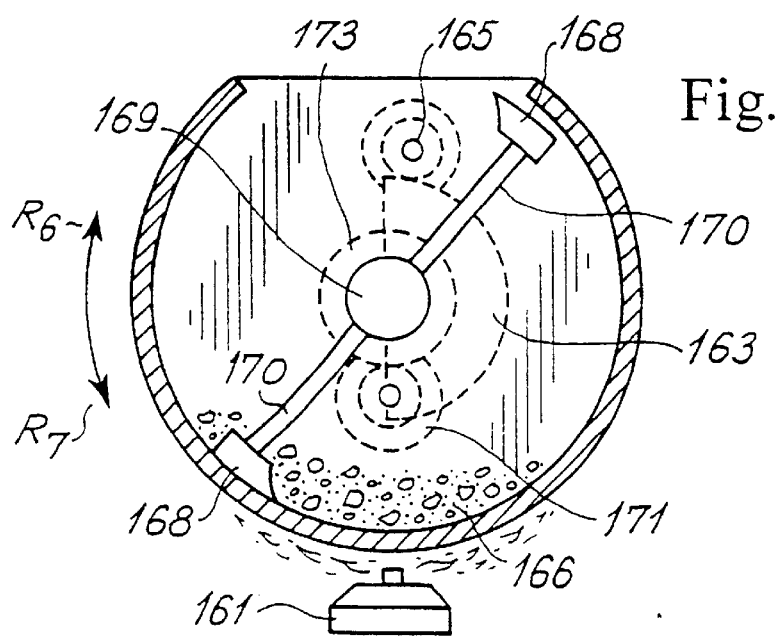
Figure 19B:
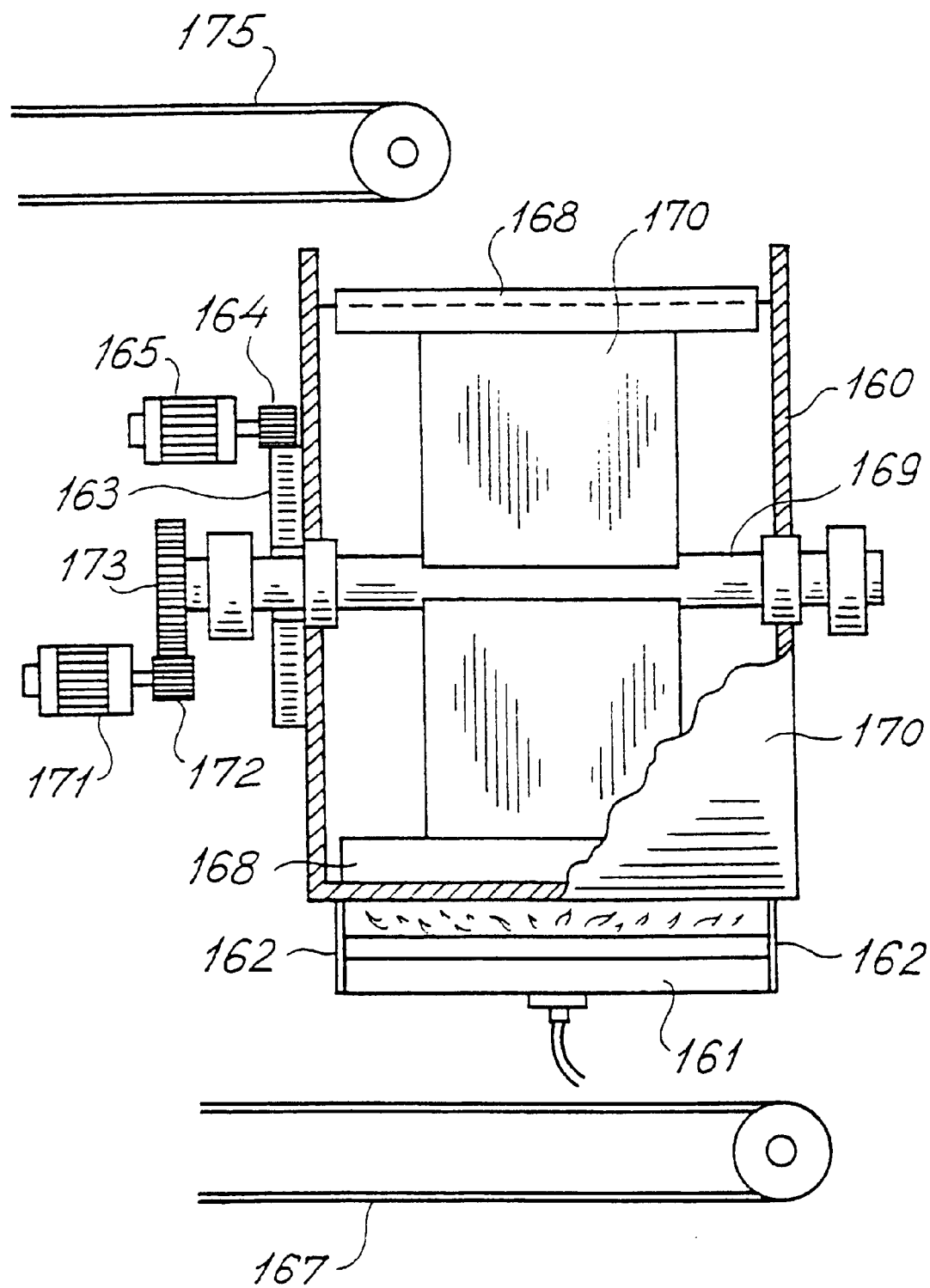

Finally, referring to FIGS. 19a–19b, a drum 160 open at the top is arranged pivotable to and from around the axis thereof in a frame (not shown). The bottom of the drum 160 is heated by gas burners 161 attached to the end walls of the drum 160 by means of arms. One end wall of the drum 160 is provided with a fixedly attached toothed plate 163, the teeth of which mesh with the teeth of a pinion 164 driven by a step motor 165. The drum 160 with the gas burners 161 may thus be pivoted to and from in the direction of the arrows R6 and R7 so that the open top may be pivoted to the bottom for emptying the discrete pieces 166 out of the drum unto a conveyor 167 after the stir-frying process has been completed.

The stirring and scraping functions are performed by two scraping and stirring elements 168 arranged on a shaft 169 by means of arms 170. The shaft 169 is rotated by means of an electrical motor, a pinion 172 and a gear 173 attached to the shaft.

The drum 160 is slightly flared towards the opening at the top in FIG. 19a, i.e. the diameter of the drum 160 increases from a constant value at the bottom half. The length of the arms 170 are chosen such that the arms are forced to flex slightly in the bottom half of the drum to exert an elastic force on the scraping elements 168 for ensuring a good scraping effect.

The scraping elements 168 are shown as being in one piece, but they may be constituted by or comprise discrete elements similar to the elements 27 of FIGS. 4a–4e.

Furthermore, the scraping elements may be of any curved shape conforming to the inner surface of the drum so that a mixing effect may be obtained by means of the curvature. It is obvious that more than two scraping elements may be provided both in the longitudinal direction of the drum and the circumferential direction thereof.

The discrete pieces 166 to be stir-fried are loaded batchwise into the drum 160 by means of a conveyor 175 and after being stir-fried they are discharged from the drum by pivoting the drum as discussed above. Obviously the different ingredients of the finished stir-fried product may be loaded into the drum at different points in time depending on the requirements of the stir-frying process.

Figure 20A:
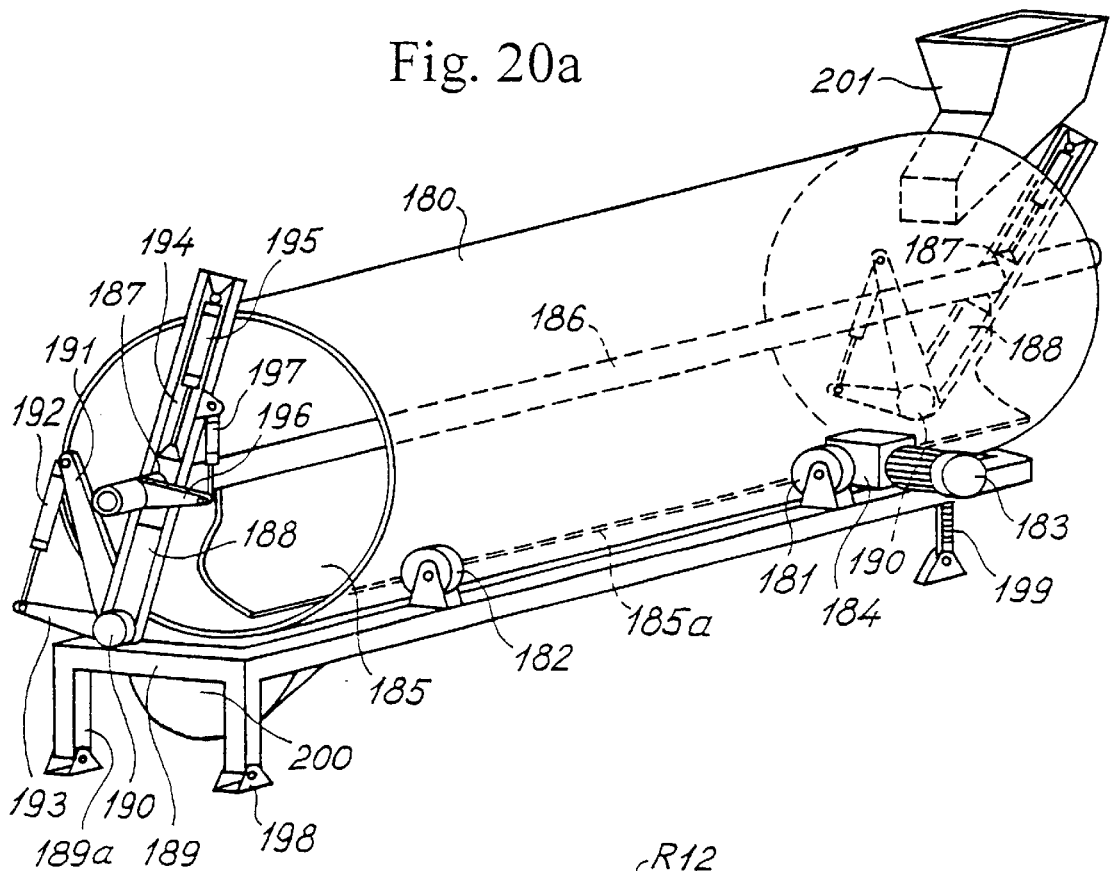
FIGS. 20a–b show an isometric side view and an end elevational view, respectively, of an embodiment similar to the one shown
Figure 20B:
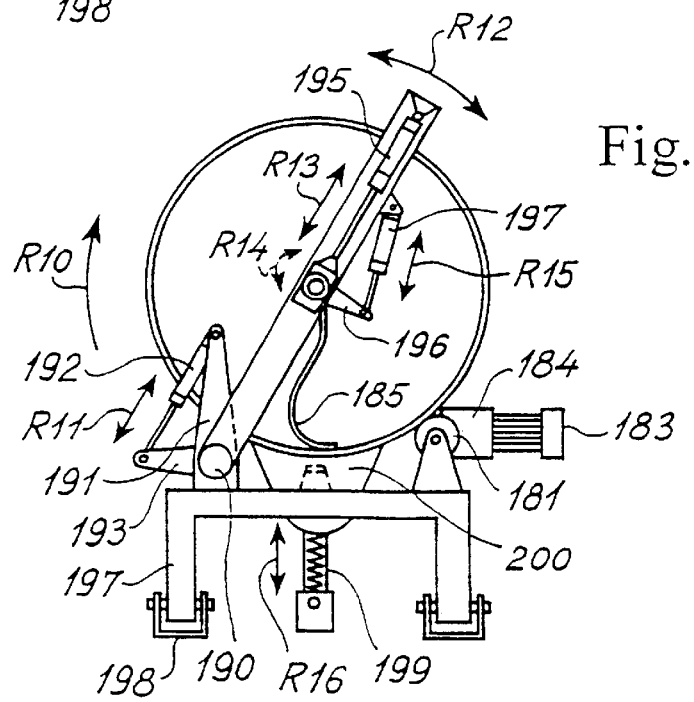

Referring now to FIGS. 20a–b, a circular cylindrical body 180 of cast iron or a similar heat conducting material is arranged for rotation in an inclined position on two pairs of rollers 181 and 182. One of the rollers 181 is driven for rotation by a suitable motor 183 and transmission 184 and imparts rotation to the cylindrical body 180 in the direction of the arrow R10.

An elongate flexible scraper blade 185 is fixedly attached to a shaft 186 journalled in bearings 187 slidably arranged on swivel arms 188 at either end of the body 180. The swivel arms 186 are pivotably arranged on a frame 189 by means of pivots 190 fixedly arranged on the frame 189. A fixed arm 191 is fixedly attached to the frame 189 and is pivotably connected to a hydraulic cylinder 192 pivotably connected to a torque arm 193 fixedly connected to the swivel arm 188 such that reciprocating movement of the piston of the cylinder 192 as indicated by arrows R11 will pivot the swivel arm 188 to and from around pivot 190 as indicated by arrows R12.

The bearings 187 and thus the shaft 186 may be moved to and from along a channel 194 in each of the swivel arms 188 in the direction of the arrows R13 by means of reciprocating action of a hydraulic cylinder 195 whereby the shaft 186 may be shifted relative to the axis of the cylindrical body 180.

Finally, the shaft 186 may be pivoted to and from as indicated by arrows R14 relative to the swivel arms 188 by means of torque arms 196 fixedly attached to the shaft 186 and pivotably attached to hydraulic cylinders 197 causing the pivoting of the shaft 186 by the reciprocating movement of the piston of the cylinder as indicated by arrows R15.

The frame 189 is supported at one end (outlet) by legs 189a provided with pivotable shoes 198 and at the other end (inlet) by a jack 199 allowing the inlet end to be lifted and lowered so as to alter the inclination of the cylindrical body 180 as indicated by arrows R16.

The outlet end of the cylindrical body is provided with a slisk 200 for discharging the stir-fried product, while the inlet end is provided with a feeder chute 201 for introducing the discrete pieces to be stir-fried in the apparatus.

The cylindrical body 180 is heated by gas nozzles (not shown) arranged below the body and may be enclosed such that the combustion gasses may be removed. A heat insulating envelope may be arranged to at least partially enclose the cylindrical body so as to reduce heat loss to a minimum.

The discrete pieces to be stir-fried are introduced at the inlet end of the cylindrical body through chute 201 and are stirred by the tumbling effect of the rotation of the cylindrical body 111 while the scraping effect is achieved by means of the scraping edge 180a of the scraping blade 180 during said rotation. The scraping blade will also have a certain stirring effect. By adjusting the jack 199, the inclination of the body 11 may be altered and thereby the transport speed through the body may be adjusted according to the product to be stir-fried.

Figure 20C:
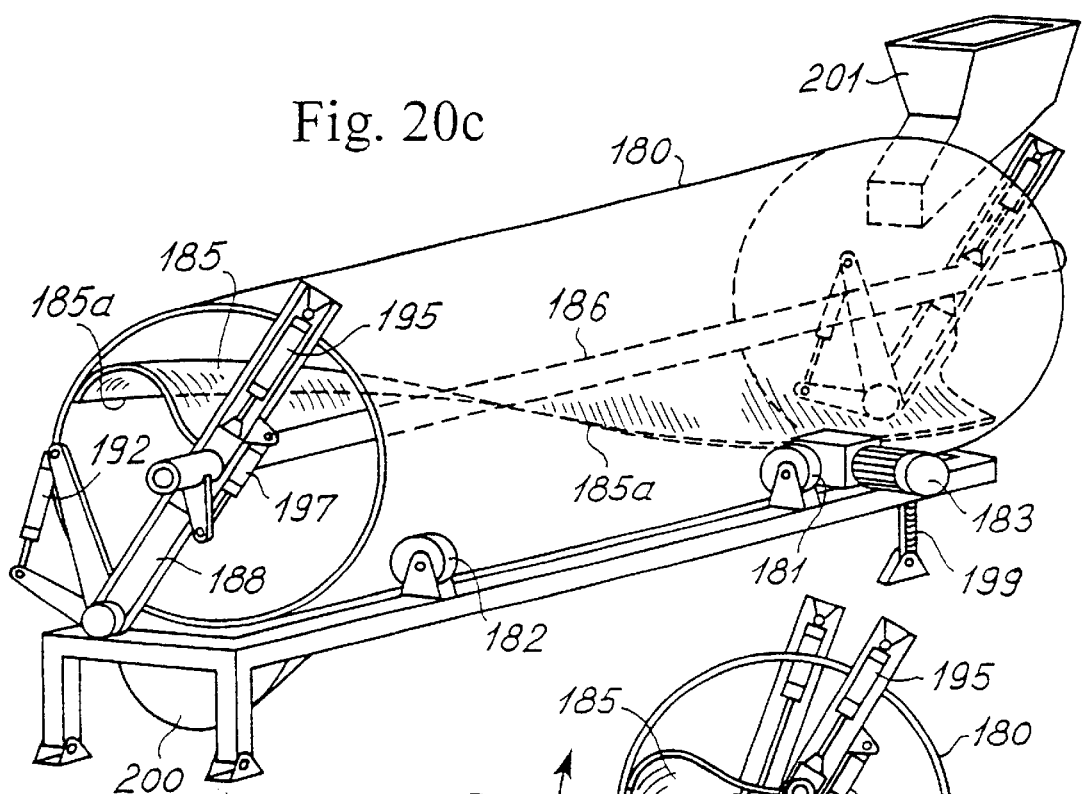
Figure 20D:
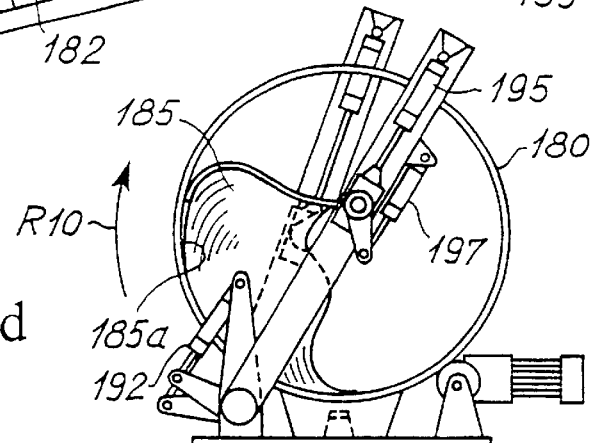

So as to achieve a more positive and adjustable control of the transport of the discrete pieces through the cylindrical body and thereby the frying time for the product, the system of hydraulic cylinders 192, 195 and 197 may be utilized as illustrated in FIGS. 20c–d.

For some products it is especially important that the frying time for each and every discrete piece to be stir-fried be as uniform as possible so as to avoid under-cooked and especially over-cooked or even charred pieces.

By controlling the movements of the three hydraulic cylinders at each end of the cylindrical body 180, the flexible scraper blade 185 and the scraping edge 180a thereof may be brought to undulate in a manner that provides positive and precisely controlled transport forces for transporting the discrete pieces through the cylindrical body 180 from inlet end to outlet end.

The control of the hydraulic cylinders may be programmed into a PLC-control unit in a manner well known by those skilled in the art so that a precise coordination of the movement of the shaft according to arrows R12, R13 and R14 at each end of the body 180 such that a configuration of the flexible scraper blade 185 can be obtained as illustrated in FIGS. 20c–d.

This configuration will change continuously such that an undulating movement of the scraper edge 185a relative to the inner surface of the body 180 is obtained so as to positively push the discrete pieces through the body in a precisely controlled manner that may be varied according to various parameters such as product type, size of the discrete pieces and so on.

If a cross section of the body 180 is thought of as a clock with the bottom at 6 o'clock and the top at 12 o'clock and the body rotates as shown clock-wise, then the scraper blade edge 185*a* can for instance be adjusted to contact the body inner surface at 9 o'clock at the inlet end where perhaps a large supply of heat to the discrete pieces is required and at 6 o'clock at the outlet end where perhaps less heat transfer is required. The scraper edge 185*a* will then describe a curve from 9 to 6 o'clock. This curve may then be varied from a straight line with the swivel arms at each end of the body in the same position to a curved line with the two swivel arms in different positions.

When an optimum frying procedure for a given product has been achieved by adjusting the inclination of the body 180, the rotational speed thereof, the temperature of the inner surface thereof, the position of the flexible scraper blade 185 relative to the radius and axis of the body as well as the undulating movement of the scraper blade 185 and the frequency thereof, these data may be input to the PLC-controller for achieving a precise duplication of the parameters when desiring to stir-fry the same product subsequently.

The cylindrical body 180 may be constituted by two or more standard issue cast iron pipes with flanges bolted together length-wise.

The outlet end may be prolonged with a cooling section for cooling the product, said cooling section either being cooled by air or some cooling fluid such as water. The cooling may be carried out in a separate cylindrical body arranged after the cylindrical body 180.

The frying oil or grease may be supplied together with the discrete pieces or may be sprayed into the body 180 through special nozzles.

The modulated or undulating movement of the scraper blade may be achieved by any other suitable means allowing flexing and torsion of the blade by displacing the blade or support means therefor radially relative to the axis of the cylindrical body and/or angularly relative to said axis. Said means may comprise cams and cam followers or a system of gears at each end of the cylindrical body supporting a flexible scraping means that may have any suitable configuration allowing scraping of substantially the entire heated interior surface of the cylindrical body. The flexible scraper blade may for instance be replaced by a series of flexible arms arranged on one or more shafts that may be displaced radially and angularly relative to the axis of the cylindrical body.

Figure 20E:
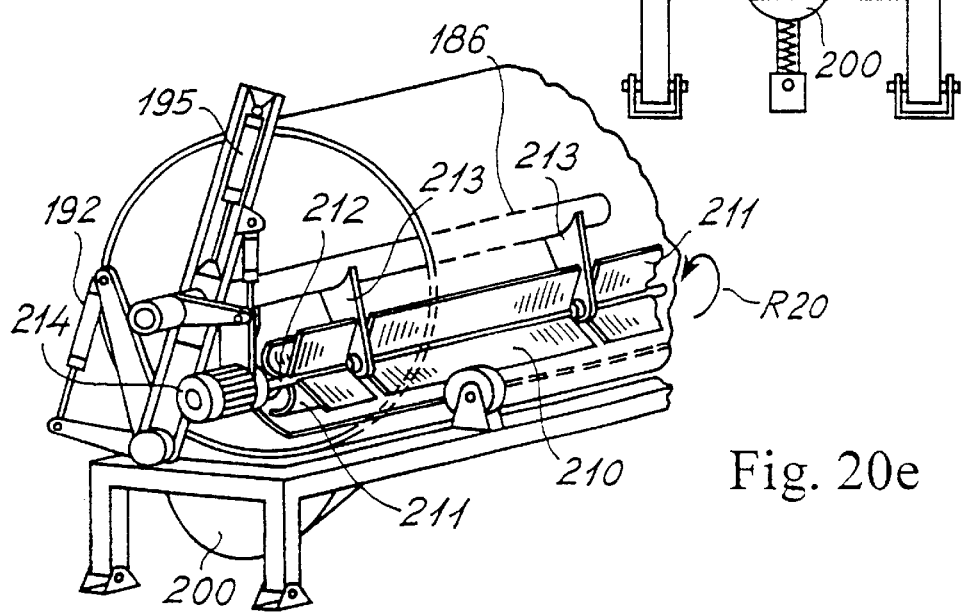
FIG. 20e shows a cut-away view of the embodiment of FIGS. 20a–b with a cleaning device for the scraper blade.

Referring now to FIG. 20*e*, a rotative elongate flexible cleaning paddle wheel or turbine 210 having flexible paddles 211 is arranged adjacent the flexible scraper blade 185 for cleaning any adhered material originating from the discrete pieces or from the frying liquid from the surface of the scraper blade 185.

The flexible paddles are arranged on a flexible shaft 212 supported by and journalled in brackets 213 fixedly attached to the shaft 186 and driven for rotation in the direction of the arrow R20 by an electric motor 214 fixedly attached to the shaft 186.

In operation, the paddle turbine 210 will sweep the paddles 221 thereof across substantially the entire counter flow surface of the scraper blade 185 and will follow the undulating path of the blade because of the flexibility of the turbine shaft 212.

It will be obvious to those skilled in the art that many modifications may be made to this cleaning device. For instance, the paddles may be replaced by brushes, or nozzles for high-pressure compressed air may be arranged adjacent the counter flow surface, the shaft 212 comprising a duct for supplying the compressed air to the nozzles.

The stir-frying of chopped or minced meat presents special problems, because this is a difficult raw material because the discrete pieces of minced meat have a tendency to agglomerate and form a sticky mass.

An alternative way of processing chopped or minced meat by means of a heated rotating cylindrical body as described above is to form the raw meat into agglomerations such as balls of suitable size (1–3 cm in diameter) and subject the agglomerations to a first stir-frying process so as to coagulate the meat in the agglomerations and thereafter disintegrate the agglomerations and finally subject the disintegrated agglomerations to a further stir-frying process to impart to the discrete pieces of meat thus obtained the desired attractive brown crisp crust.

In the following, several different embodiments of the method and apparatus according to the invention particularly suited for stir-frying of chopped meat will be described.

Figure 21:
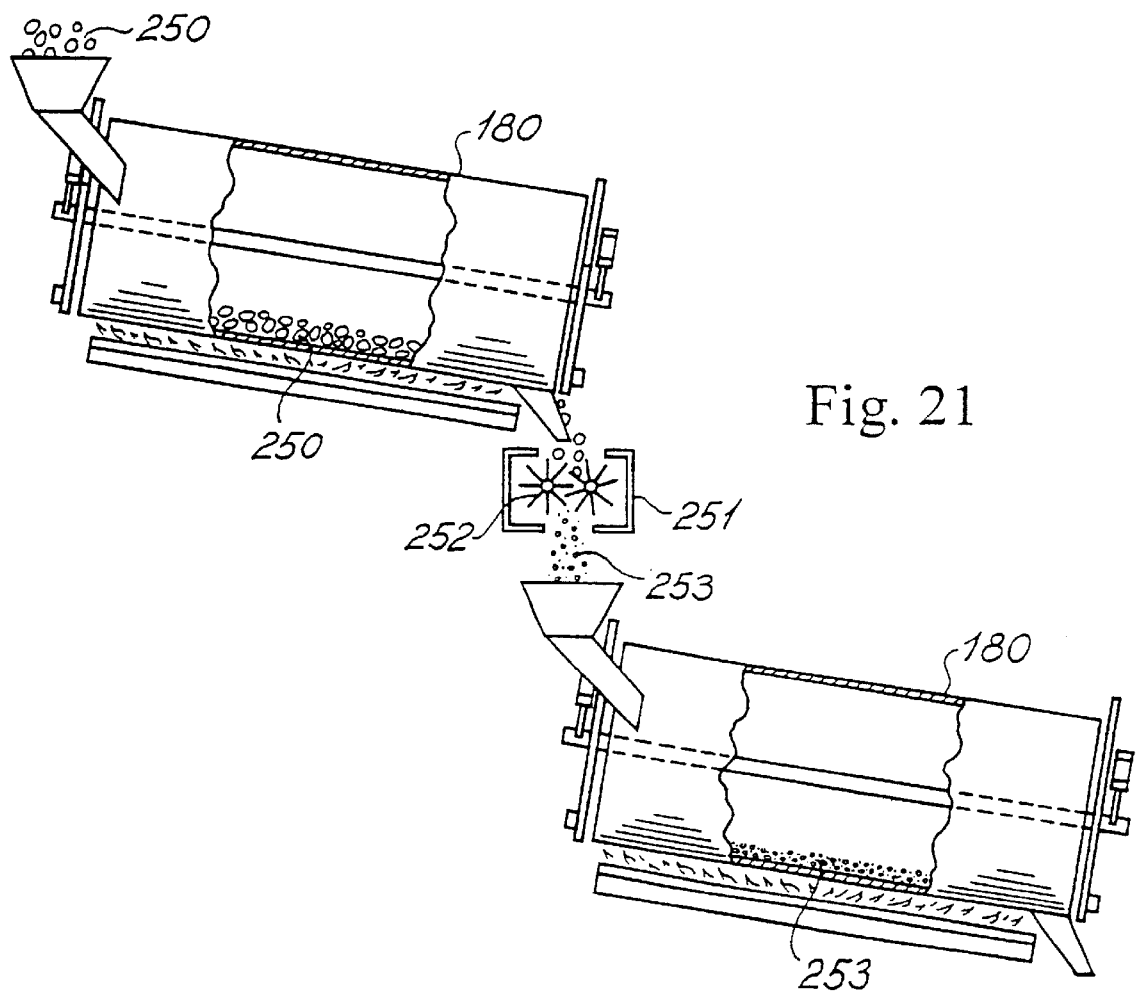
FIG. 21 shows a lateral elevational, partly sectional view of two of the apparatus of FIGS. 20a–b arranged in series.

Referring now to FIG. 21, two circular cylindrical bodies 180 substantially identical to the embodiment of FIGS. 20*a–b* are arranged in series. The first one is supplied with minced or chopped meat agglomerated to form balls 250 that are stir-fried in said first body so as to coagulate the meat substantially all the way through the balls. The coagulated balls 250 are thereafter discharged to a disintegrator 251 having knife rollers 252 rotating and meshing such that the meat balls 250 are disintegrated to form discrete pieces discharged into the second cylindrical body 180 in which the discrete pieces are subjected to continued stir-frying as described above.

The same configuration may also be obtained by replacing one or both of the cylindrical bodies 180 with one or two, respectively, apparatus of the type shown in FIG. 1.

Figure 22:
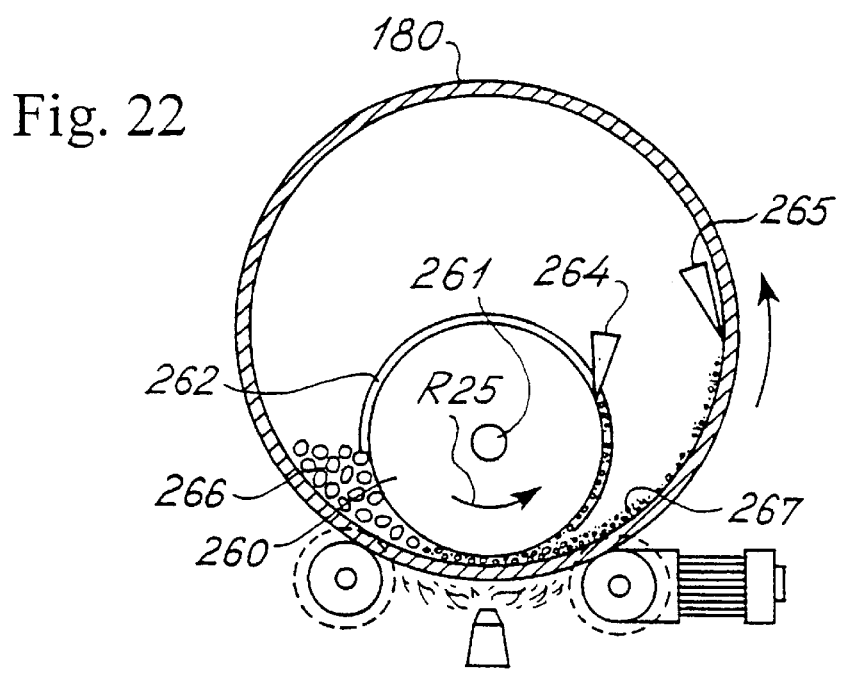
FIG. 22 shows an end view of a modification of the embodiment shown in FIGS. 16a–b.

Referring now to FIG. 22 a rotative body 180 substantially identical to the one shown in FIG. 20*a* is provided with a smooth circular cylindrical roller 260 mounted on a rotative shaft 261. The roller 260 is at one axial end thereof provided with a flange 262 having a circumferential surface suited for engaging the inner surface of the body 180 for frictionally driving the roller 260 as indicated by the arrow R25.

The roller 260 is arranged at the inlet end of the body 180 with the flange 262 proximal to said inlet end. Elongate scraper bodies 264 and 265 are arranged to scrape the entire smooth surface of roller 260 and substantially the entire inner surface of the cylindrical body 180, respectively, in a manner very similar to the scraper body 118 in FIG. 16.

Meat balls 266 or even whole chunks of chopped or minced meat are fed into the body 180 downstream of the flange 262 by suitable feeding and distributing means (not shown) and are disintegrated into discrete pieces 267 by being mashed between the roller 260 and the interior surface of the body 180, the scraper bodies 264 and 265 removing any adhering material from the respective surfaces of the roller 260 and the cylindrical body 180. In this case, the stir-frying of the discrete pieces 267 in the portion of the cylindrical body downstream of the roller 260 takes place substantially as described in connection with the embodiment of FIG. 16.

Figure 23:
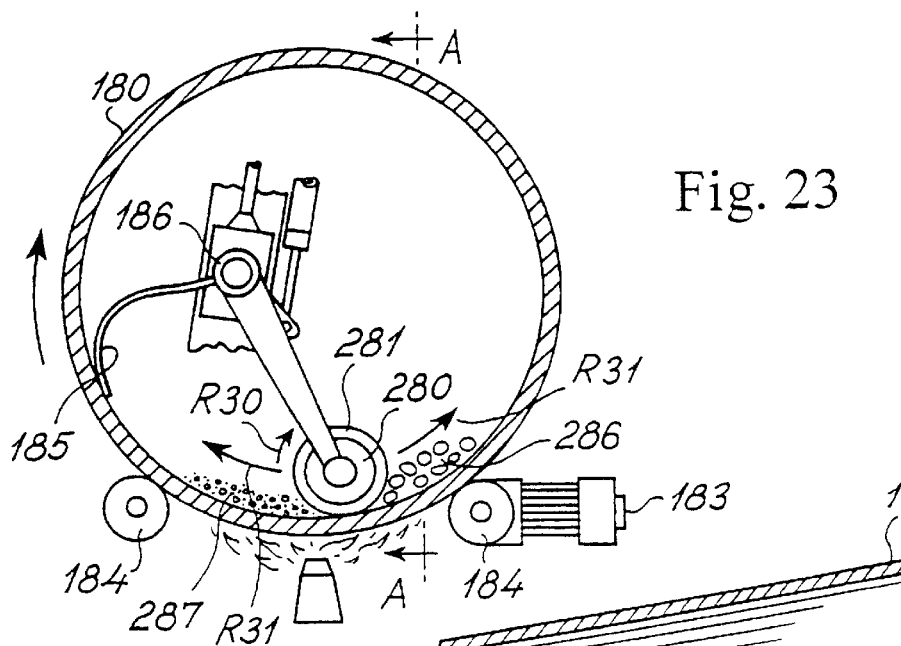
FIG. 23 shows and end view of yet another modification of the embodiment shown in FIGS. 16a–b.
Figure 24:
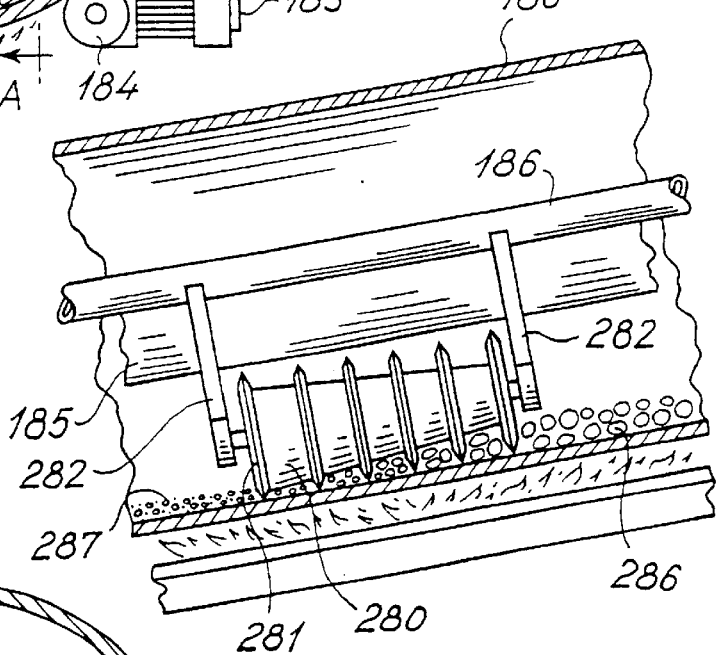
FIG. 24 shows a cut-away cross sectional view along line A—A in FIG. 23.

Referring now to FIGS. 23–24, the embodiment of the apparatus according to the invention shown in FIG. 20*a* is provided with a conical roller 280 provided with annular spaced flanges or knives 281 and supported for rotation in the direction of the arrow R30 by arms 282 fixedly attached to the shaft 186 such that it can be swung to an from in the direction of the arrows R31. The roller 280 is located approximately half way between the inlet and outlet end of the cylindrical body 180.

In operation, meat balls 286 are fed into the inlet end (to the right in FIG. 24) and are coagulated in the first half of the stir-frying process. The coagulated meat balls are disintegrated by the action of the conical roller 280 swinging to and from and rotating thereby providing a mashing and cutting effect of the roller 280 and the knives 281 on the meat balls. The discrete pieces 287 thus formed are stir-fried in the portion of the cylindrical body downstream (to the left in FIG. 24) of the roller 280.

Many modifications of the disintegration means are conceivable by those skilled in the art, and features from the various embodiments described above may be combined in various ways.

In connection with stir-frying of certain food-stuffs or when certain characteristics are desired for the end product, it may be desirable to separate the liquid originating from the food-stuff and/or the frying oil or grease from the discrete pieces being stir-fried such that a boiling effect is avoided.

Figure 25:
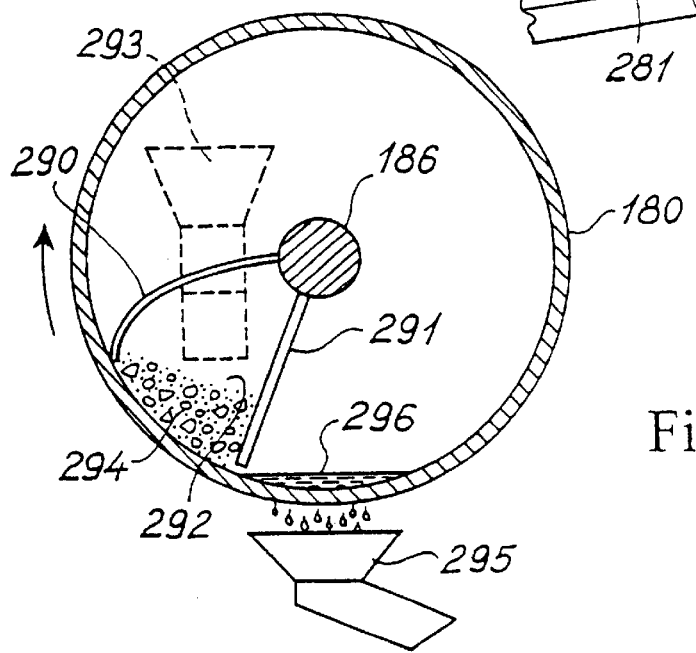
FIG. 25 shows an end view of a modification of the embodiment in FIGS. 20a–b with an extra scraper blade.

In FIG. 25, the shaft 186 is provided with a scraper blade 290 similar to the scraper blade 185 of FIG. 20a as well as an extra elongate flexible blade 291 angularly spaced from the scraper blade 290 so as to form a compartment 292 extending along substantially the entire length of the cylindrical body 180. A feeding hopper 293 is arranged for feeding discrete pieces 294 to be stir-fried into the inlet end of the cylindrical body 180 so that the discrete pieces are fed into the compartment 292. An outlet funnel 295 is arranged below the outlet end of the cylindrical body 180 to receive the liquid 296 to be separated from the discrete pieces in the compartment. Hereby, the liquid is constantly kept separate from the discrete pieces except for a frying film contantly being carried along by the inner surface of the cylindrical body during rotation thereof.

Many other ways of separating the liquid from the discrete pieces are conceivable to those skilled in the art. For instance, a series of apertures covered by a screen may be provided in the cylindrical body 180 for cooperation with receiving means for the liquid discharged through said apertures.

EXAMPLES

The following experiments were carried out demonstrating that the invention yields stir-fried pieces of vegetables or meat, of fried minced meat and of complete dishes, all of a uniform and high quality. A degree of filling, which allowed for good mixing while keeping the amount of material crossing the axis reasonably low, was found by experiments to be 100–150 g for the particular apparatus used. The apparatus used was as shown in FIGS. 1–3, the internal diameter of the casing 14 being 200 mm and the length thereof 1450 mm, while the external diameter of the helical body 4 was 196 mm and the pitch thereof was 72 mm. The length of the portion 27a along the rim 5a of the helix was 24 mm and the width thereof was 10 mm, while the length of the portion 27b was 50 mm, the width thereof parallel to the axis of the helix was 7 mm and the width thereof at right angles hereto (of surface 27d in FIG. 4b) was 3,5 mm.

Example 1

10 portions of 75 g potato cubes (10 mm) and 75 g carrot cubes (10 mm) were fed to the machine. The potatoes and carrots were not mixed at all in the beginning, but during the transportation inside the tube good mixing took place as judged by visual inspection. The potato and carrot cubes left the machine as a continuous stream of well-mixed potato and carrot cubes. This demonstrates that the conveying and mixing performance of the machine is excellent.

Example 2

Portions of 100 g of vegetable cuttings were fed to the machine which had been heated to the desired temperature. A few drops of edible oil were added to each portion. The frying time was adjusted by varying the rotational speed of the helix. The temperature distribution was found to be rather uniform along the tube, the middle temperature being the highest and taken as the nominal frying temperature. At the optimal combination of temperature and frying time, the vegetable cuttings left the machine well done, with a firm texture and an attractive crispy surface. The table below summarizes some of the results obtained:

TABLE 1

| Vegetable | min. | Temp. | Sensory evaluation |
|---|---|---|---|
| Carrot cubes | 6.0 | 200° C. | Well done, crisp surface |
| Potato cubes | 6.0 | 200° C. | Still not done, soft |
| Potato cubes | 6.0 | 250° C. | Well done, crisp surface |
| Green peas | 3.9 | 180° C. | Well done, crispy, no damage to peas |
| Green peas | 5.9 | 180° C. | Slightly overdone, some deformation of peas |
| Green peas | 3.3 | 200° C. | Almost done, crispy, slightly darkened colour |
| Green peas | 5.9 | 200° C. | Overdone, darkened colour, deformation of peas |
| Chopped cabbage | 3.9 | 150° C. | Half done, colour begins to darken |
| Chopped cabbage | 3.9 | 180° C. | Still not well done, darker colour |
| Chopped cabbage | 7.8 | 180° C. | Almost done, brown colour, soft but with crispy texture, smells like cooked cabbage |

The results are indicative of that optimal combinations of frying times and temperatures for representative vegetable cuttings are within the working range of the machine.

Example 3

Portions of 80 g of carrot cubes were fed to the machine, which had been heated to 240° C. A few drops of edible oil were added to each portion. Three experiments were conducted at rotational speeds of 2.5 rpm, 5.0 rpm, and 8.6 rpm, respectively. These values correspond to process times of 7.8, 3.9, and 2.4 min. for carrots transported along a full length of the frying tube. By temporarily inserting a square rubber plate in place of one of the scrapers, it was possible also to recover samples of carrots which had been processed for ¼, ½, and ¾ of the above process times. Immediately after sampling the carrots were transferred to a calorimeter, and the average temperature of the carrots was determined knowing the mass and heat capacity of the carrots. Dry matter contents of the processed carrots were determined by drying to constant weight (40 min.) in an Infrared Moisture Determination Balance. From the dry matter determinations the amount of water evaporated during processing could be calculated.

Table 2 shows the main results obtained. It is particularly noteworthy that the average temperature of the carrots in all three experiments never reaches above 70° C. despite that a substantial portion of the water content had evaporated. This can be explained by the extremely rapid evaporation, which take place from the free surfaces of the carrot cubes.

Detailed calculations also showed that most of the evaporation took place in the beginning of the process, and this may be explained by the formation of a less permeable frying crust later in the process. Microscopy of the carrots revealed that the cells of the interior were intact while the cells at the outer layer had shrunk, thus indicating the formation of a crust. The attractive crisp texture of a well-done product may therefore be described to the effect of processing at a lower temperature than 100° C. which is less deleterious to the cell walls, and the formation of a frying crust.

TABLE 2

|  | Temperatures at: | | |
| --- | --- | --- | --- |
|  | 2.5 rpm | 5.0 rpm | 8.6 rpm |
| ¼ process time | 65° C. | 55° C. | 49° C. |
| ½ process time | 62° C. | 66° C. | 61° C. |
| ¾ process time | 60° C. | 63° C. | 60° C. |
| Full process time | 56° C. | 60° C. | 61° C. |
| Total water evaporated (g pr. 100 g carrot) | 8.5 g | 17.2 g | 28.6 g |
| Sensory evaluation | soft not crisp | well done crisp | raw inside |

Example 4

Portions (140–150 g) of meat cuts (chicken and beef respectively) were fed to the machine and fried at 240° C. for different periods of time. Edible oil was added to each portion. Table 3 shows the results from the sensory evaluations, and it appears that both types of meat can be processed, but they require different process times:

TABLE 3

| Process time | Chicken Meat | Beef |
| --- | --- | --- |
| 2.4 min. | Best, soft texture, good taste | (not tried) |
| 2.9 min. | Soft texture, good taste | (not tried) |
| 3.9 min. | A little dry, good taste | Light brown colour, still slightly raw |
| 4.6 min. | Dry texture, good taste | Well done, juicy texture |
| 5.9 min. | (not tried) | Well done, a little dry |

Example 5

A complete recipe for a stir fried chicken dish was tried. The dish consisted of: chicken meat pieces in small cuts (600 g), blanched bean sprouts (600 g), blanched bamboo shoots (600 g), cut and blanched white cabbage (450 g), blanched red pepper (450 g), cut and blanched leek (300 g), soaked and cut black Chinese mushrooms (150 g). Spices (salt, garlic, curry, soy sauce) was added according to taste. The mixed ingredients were fed to the machine in suitable portions (80–100 g) and fried at 240° C. for 3.3 minutes. Edible oil were added to each portion, using about 100 g total. The fried dish was collected continuously and immediately served to persons qualified in evaluating the quality of stir-fried dishes. The dish was evaluated as good.

Example 6

Portions of minced beef of various shapes and sizes were fed to the machine and fried at 240° C. for different periods of time. Edible oil was added to each portion. Table 4 shows the results from the sensory evaluations and the observations of the movement of the pieces, and it can be concluded that pre-forming of the meat is essential for a good result.

TABLE 4

| Size and shape | Time | Evaluation |
| --- | --- | --- |
| 150 g, one irregular only piece | 4.6 min. | The piece was sticky and partly disintegrated, half way through the machine. Underprocessed |
| Pieces 2 × 3 × 0.5 cm, (Individually fed) | 4.6 min. | Slightly sticky. Movement improved after 1 min. Soft texture slightly underprocessed |
| Pieces 2 × 3 × 0.5 cm, (individually fed) | 5.9 min. | Slightly sticky. Movement improved after 1 min. Well done, good taste of grilled beef |
| Balls 1.0–1.5 cm. diam. (3 balls at a time) | 5.9 min. | Easy movement and mixing Soft texture, almost done |
| Balls 1.0–1.5 cm. diam. (3 balls at a time) | 7.8 min. | Easy movement and mixing Soft texture, Well done, good taste of grilled beef |

Various modifications and variations of the method and apparatus according to the invention are conceivable for those skilled in the art without departing from the scope of the invention as defined in the appended patent claims.

Thus, the surface of the heated surface may be of the non-stick type having a surface layer comprising a non-stick coating such as teflon or a combination of priming and particle application in a coating having good non-stick properties combined with a good resistance against abrasion, scratching and so on of the type well known within the field of frying pans.

What is claimed is:

1. A method of stir-frying discrete pieces or particles of one or more foodstuffs, the method comprising the steps of:
   providing a heated surface;
   supplying the discrete pieces to the heated surface for bringing them into direct heat conducting contact therewith,
   providing mechanically driven stirring means,
   stirring the discrete pieces so that the orientation of the discrete pieces with respect to the heated surface is altered such that various surface portions of the discrete pieces are brought into heat conducting contact with the heated surface;
   providing scraping means adjacent the heated surface;
   scraping substantially the entire area of the heated surface contacted by the discrete pieces so as to remove any layer of material originating from the foodstuffs and adhering to the heated surface; and
   removing the discrete pieces from contact with the heated surface for transfer to a separate storing or processing means for said discrete pieces in stir-fried condition.

2. The method according to claim 1, wherein the heated surface comprises a substantially circular cylindrical body, and the stirring means comprise a helical body arranged for rotation at least partly within and in close proximity to said cylindrical body and extending from said first portion of the heated surface to said second portion of the heated surface such that rotation of the helical body transfers the discrete pieces along the cylindrical body substantially parallel to the axis thereof from said first portion or said further portions to said second portion.

3. The method according to claim 1, wherein the heated surface comprises a substantially circular cylindrical body arranged for rotation about the axis thereof, and the scraping means and stirring means comprise flexible means arranged for contacting the interior surface of the cylindrical body and for movement relative to said interior surface.

4. The method according to claim 3, wherein the flexible means are arranged for movement relative to said interior surface such that the transport of the discrete pieces to be stir-fried from an inlet end of the cylindrical body to an outlet end thereof is at least partly caused by said relative movement of said flexible means.

5. The method according to claim 1, wherein the method further comprises the step of cooling the stir-fried discrete pieces.

6. The method according to claim 1, wherein the method further comprises the step of separating any liquid formed as well as any flowable frying substance from the discrete pieces continuously during the stir-frying process and/or at the end thereof.

7. The method according to claim 1, wherein the discrete pieces comprise minced meat, the method comprising the additional steps of:

forming agglomerations from the minced meat;

supplying the agglomerations to the heated surface for at least partly coagulating the minced meat in the agglomerations;

subjecting the agglomerations to a disintegration precess so as to disintegrate the agglomerations at least partly into the constituent discrete pieces; and supplying the disintegrated agglomerations to a heated surface for continued stir-frying thereof.

8. A method according to claim 1, wherein the heated surface comprises a generally circular cylindrical bowl-shaped portion with a substantially vertical axis of symmetry, the discrete pieces being introduced into contact with the heated surface batch-wise and removed therefrom batch-wise after being stir-fried.

9. An apparatus for stir-frying discrete pieces or particles of one or more food-stuffs, stuffs, the apparatus comprising:

a frame supporting a surface to be heated, stirring means for stirring said discrete pieces so that the orientation of the discrete pieces with respect to the surface is altered such that various surface portions of the discrete pieces are brought into heat conducting contact with the surface;

scraping means arranged adjacent said surface for scraping substantially the entire area of the surface contacted by the discrete pieces so as to remove any layer of material originating from the foodstuffs and adhering to the surface;

inlet means for supplying the discrete pieces to the surface for bringing them into direct heat conducting contact therewith; and outlet means for removing the discrete pieces from contact with the surface for transfer to a separate storing or processing means for said discrete pieces in fried condition.

10. The apparatus according to claim 9, wherein the heated surface comprises a substantially circular cylindrical body, and the stirring means comprise a helical body arranged for rotation at least partly within and in close proximity to said cylindrical body and extending from said first portion of the heated surface to said second portion of the heated surface such that rotation of the helical body transfers the discrete pieces along the cylindrical body substantially parallel to the axis thereof from said first portion or said further portions to said second portion.

11. The apparatus according to claim 10, wherein the scraping means comprise scraping elements attached to the outer helical rim of the helical body.

12. The apparatus according to claim 10, wherein the stirring means comprise stirring elements attached to the outer helical rim of the helical body.

13. The apparatus according to claim 9, wherein a common integral element constitutes a stirring element and a scraping element.

14. The apparatus according to claim 10, wherein the axes of the cylindrical body and the helical body are arranged at an acute angle relative to the horizontal plane such that at least a substantial fraction of the weight of the helical body is supported by the cylindrical body.

15. The apparatus according to claim 9, wherein the heated surface comprises a substantially circular cylindrical body arranged for rotation about the axis thereof, and the scraping means and stirring means comprise flexible means arranged for contacting the interior surface of the cylindrical body and for movement relative to said interior surface.

16. The apparatus according to claim 15, wherein the flexible means are arranged for movement relative to said interior surface such that the transport of the discrete pieces to be stir-fried from an inlet end of the cylindrical body to an outlet end thereof is at least partly caused by said relative movement of said flexible means.

17. The apparatus according to claim 15, wherein the apparatus further comprises driving means for driving the flexible means for said relative movement and controlling means for controlling said driving means according to a set of pre-determined parameters corresponding to the characteristics of the discrete pieces to be stir-fried and/or the characteristics of the stir-fried end product to be obtained.

18. The apparatus according to claim 9 for stir-frying discrete pieces comprising minced meat and further comprising disintegration means for disintegrating agglomerations of the minced meat.

19. The apparatus according to claim 18, wherein the disintegration means comprise a substantially smooth circular cylindrical roller and/or a conical roller preferably provided with cutting or mincing projections on the surface thereof and arranged for rotation adjacent the heated surface.

20. The apparatus according to claim 10, wherein the helical body is arranged for transverse movement to and from at right angles to the axis thereof.

21. The apparatus according to claim 10, wherein the helical body is arranged for longitudinal movement parallel with the axis thereof.

22. The apparatus method according to claim 9, wherein the heated surface comprises a generally circular cylindrical bowl-shaped portion with a substantially vertical axis of symmetry.

23. A stir-fried product produced by means of the method according to claim 1.

* * * * *

UNITED STATES PATENT AND TRADEMARK OFFICE
CERTIFICATE OF CORRECTION

PATENT NO.       : 6,331,323 B1
DATED            : December 18, 2001
INVENTOR(S)      : Alder-Nissen et al.

It is certified that error appears in the above-identified patent and that said Letters Patent is hereby corrected as shown below:

Title page,
Item [56], U.S. PATENT DOCUMENT, "Green, Jr." should be -- Groen, Jr. --

Column 2,
Line 20, "to and from" should be -- to and fro --.

Column 3,
Line 46, "C." should be -- C --.

Column 4,
Line 17, "stirring, By" should be -- stirring. By --.
Line 44, "from" should be -- fro --.

Column 7,
Line 13, "from" should be -- fro --.

Column 8,
Line 14, delete the second occurrence of "invention".

Column 10,
Line 45, "from" should be -- fro --.

Column 11,
Line 54, "a n" should be -- an --.
Line 56, "introduce d" should be -- introduced --.

Column 12,
Line 31, "from" should be -- fro --.
Line 55, "shaped" should be -- shapes --.

Column 13,
Line 6, "w as" should be -- was --.
Line 65, delete the second occurrence of "scraping".

Column 16,
Line 7, "particle" should be -- particles --.
Line 18, "where after" should be -- whereafter --.

Column 17,
Line 13, "from" should be -- fro --.

UNITED STATES PATENT AND TRADEMARK OFFICE
CERTIFICATE OF CORRECTION

PATENT NO. : 6,331,323 B1
DATED : December 18, 2001
INVENTOR(S) : Alder-Nissen et al.

It is certified that error appears in the above-identified patent and that said Letters Patent is hereby corrected as shown below:

Column 18,
Line 14, "11" should be -- 111 --.
Line 55, "from" should be -- fro --.
Line 57, "toothed plate 147" should be -- toothed plate 146 --.

Column 19,
Lines 10, 16 and 66, "from" should be -- fro --.

Column 20,
Lines 2 and 7, "from" should be -- fro --.

Column 23,
Lines 1 and 9, "from" should be -- fro --.
Line 63, "3,5" should be --3.5 --.

Column 24,
Line 64, "C." should be -- C --.

Column 25,
Lines 9, 29, 55 and 63, "C." should be -- C --.

Column 27,
Line 21, "precess" should be -- process --.

Column 28,
Line 48, "from" should be -- fro --.

Signed and Sealed this

Thirty-first Day of December, 2002

JAMES E. ROGAN
*Director of the United States Patent and Trademark Office*